United States Patent Office 3,399,211
Patented Aug. 27, 1968

3,399,211
PRODUCTION OF 2-ARYL-4(5)-NITROIMIDAZOLES
Lewis H. Sarett, Princeton, Dale R. Hoff, Cranford, and David W. Henry, Plainfield, N.J., assignors to Merck & Co., Inc., Rahway, N.J., a corporation of New Jersey
No Drawing. Filed Mar. 10, 1964, Ser. No. 350,639
3 Claims. (Cl. 260—309)

ABSTRACT OF THE DISCLOSURE

The process of nitrating 2-aryl substituted imidazoles by reaction with nitric acid in the presence of a lower alkanoic acid or anhydride to produce the corresponding 2-aryl-4(5)-nitroimidazole. The nitroimidazole is useful as an intermediate in producing 1-substituted-2-aryl-4 or 5-nitroimidazoles having antiprotozoal activity.

---

This invention relates generally to new imidazoles and more particularly to new 2-aryl nitroimidazoles and to methods for their preparation. Still more specifically, it is concerned with 1-substituted-2-aryl-5-nitroimidazoles, 1-substituted-2-aryl-4-nitroimidazoles, and structurally related isoindoles and dihydro isoquinolines, with the chemical synthesis of these new heterocyclic compounds, with compositions containing such compounds, and with the use of such compounds and compositions as parasiticides. More particularly, the invention is concerned with 1-substituted-2-aryl-5-nitroimidazoles, 1-substituted-2-aryl-4-nitroimidazoles, and related isoindoles and dihydroisoquinolines and their use as antiprotozoals. The invention is further concerned with novel nitroimidazoles useful as intermediates in the preparation of the active parasiticides and with methods for their preparation.

Histomoniasis is a poultry disease due to the protozoan parasite *Histomonas meleagridis*. This disease, also known as turkey blackhead orenterohepatitis, is a serious economic problem in the turkey-raising industry. The infestation frequently spreads rapidly in turkey flocks and high mortality rates due to the disease are common. The compounds now commercially available for treating turkey blackhead are somewhat beneficial, but none have proven entirely satisfactory because they permit development of resistant strains of the infecting organism or lead to undesired side effects when ingested by the birds in quantities sufficient to treat the disease.

The protozoan disease trichromoniasis caused by *T. vaginalis* primarily infests the human vagina and is the etiological agent of a very troublesome and prevalent form of vaginal infestation known as *T. vaginalis* vaginitis. Drugs heretofore available for treating this condition like those used for treating enterohepatitis have certain limitations and disadvantages.

One object of the present invention is to provide a new class of chemical compounds which have a high degree of antiprotozoal activity. Another object is to provide new 1-substituted-2-aryl-5-nitroimidazoles, 1-substituted-2-aryl-4-nitroimidazoles, and structurally related isoindoles and dihydroisoquinolines. A further object is to provide processes for the preparation of the novel compounds. Still another object is the provision of new nitroimidazoles which are intermediates in the synthesis of such compounds. A further object is provision of processes for the preparation of these intermediates. A still further object is provision of antitrichomonal and antihistomonal compositions containing the novel compounds of this invention as active ingredients thereof. Further objects will become clear from the following description of the invention.

According to this invention, it has now been found that certain 1-substituted-2-aryl-5-nitroimidazoles and 1-substituted-2-aryl-4-nitroimidazoles are highly effective parasiticides. Generally, the 1-substituted-2-aryl-5-nitroimidazoles are more effective parasiticides than the corresponding 1-substituted-2-aryl-4-nitroimidazoles, but both types of nitroimidazoles are particularly effective against the parasites causing histomoniasis and trichomoniasis. An important feature of the compounds of this invention is that the substituent attached to the 2-position on the imidazole moiety of the active compounds be an aryl group. The aryl substituent may be unsubstituted or substituted at one or more of the positions on the ring. Ortho, meta and para substitution and combinations thereof are contemplated by the present invention. Hereafter, when the term aryl is used in referring to a substituent on the 2-position of the imidazole moiety such term is intended to embrace substituted aryl radicals, i.e. those having attached to the aryl nucleus groups other than hydrogen.

The novel 2-aryl-nitroimidazoles of this invention may be represented by the structural formula

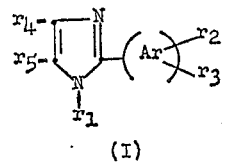

(I)

where Ar is aryl; $r_1$ is hydrogen, loweralkyl or —$(CH_2)_nX$, where $n$ has a value of 2–4 and X is halo, hydroxy or loweralkoxy; and $r_2$ is hydrogen, nitro, halo, carboxamido, sulfonamido, amino or lower alkoxy.

The symbol $r_3$ represents hydrogen, lower alkyl, carboxy, aryl, halo, hydroxy, amino, loweralkylamino, diloweralkylamino, nitro, sulfonamido, loweralkylsulfonamido, loweralkoxy, loweralkylthio, cyano, carboxamido, loweralkylcarboxamido, diloweralkylcarboxamido, formyl, loweralkanoyl, acylaminoloweralkyl, loweralkylaminoloweralkyl, diloweralkylaminoloweralkyl, N'-morpholinoloweralkyl, N'-piperidinoloweralkyl, N'-pyrrolidinoloweralkyl, hydroxyloweralkyl, loweralkoxyiminocarbonyl, amidino, loweralkylamidino, diloweralkylamidino, carboxyhydrazido, loweralkoxycarbonyl or loweralkylsulfonyl; and $r_4$ and $r_5$ are hydrogen or nitro, provided that one and only one of $r_4$ and $r_5$ is nitro.

Ar in the formula represented by I above preferably represents a phenyl or naphthyl substituent. $r_1$ may be loweralkyl such as methyl, ethyl, propyl, isopropyl, butyl and the like, or it may be a radical represented by —$(CH_2)_nX$, where X is hydroxy, loweralkoxy such as methoxy, ethoxy, propoxy and the like, or halo such as chloro, fluoro, iodo or bromo. In addition to $r_1$ being a loweralkyl group therefore it may also be hydroxyethyl, hydroxypropyl and the like, methoxymethyl, methoxyethyl, methoxypropyl, ethoxyethyl, ethoxypropyl, propoxyethyl and the like, or 2-chloroethyl, 2-fluoroethyl, 2-bromoethyl, 3-fluoropropyl, 3-iodopropyl, 3-chloropropyl and the like. Halo at the $r_2$ position may be chloro, fluoro, bromo or iodo whereas lower alkoxy may be methoxy, ethoxy, propoxy and the like.

The groups represented by $r_3$ are aryl such as phenyl or naphthyl and the like, halo such as fluoro, chloro, bromo and iodo, loweralkylamino such as methylamino, ethylamino, propylamino and the like, and diloweralkylamino such as dimethylamino, diethylamino, methylethylamino and the like. Also included among the substituents which may be represented by $r_3$ are loweralkylsulfonamido such as methylsulfonamido, ethylsulfonamido and the like, diloweralkylsulfonamido such as dimethylsulfonamido, diethylsulfonamido and the like, loweralkylcarboxamido such as methylcarboxamido, ethylcarboxamido, propylcarboxamido, isopropylcarboxamido and the like, and diloweralkylcarboxamido such as dimethylcarboxamido, diethylcarboxamido, methylethylcarboxamido and the like. There may also be found at this position loweralkanoyl such as acetyl, propionyl, and the like, loweralkyl such as methyl, ethyl, propyl, isopropyl, butyl, propyl and the like, loweralkylamino-loweralkyl such as methylaminomethyl, methylaminoethyl, methylaminopropyl, ethylaminoethyl and the like, diloweralkylaminomethyl such as dimethylaminomethyl, dimethylaminoethyl, methylethylaminomethyl, dimethylaminoethyl and the like, N-morpholinoloweralkyl such as N-morpholinomethyl, N-morpholinoethyl and the like, N-piperidinoloweralkyl such as N-piperidinomethyl, N-piperidinoethyl and the like, N-pyrrolidinoloweralkyl such as N-pyrrolidinomethyl, N-pyrrolidinoethyl and the like, hydroxyethyl, hydroxypropyl and the like, and loweralkylsulfonyl such as methylsulfonyl, ethylsulfonyl and the like. $r_3$ may also be loweralkoxy such as methoxy, ethoxy, propoxy and the like, loweralkylthio such as methylthio, ethylthio and the like, acylamino such as loweralkanoylamino, preferably acetylamino, propionylamino and the like, aroylamino, preferably benzoylamino and the like, and aralkanoylamino, preferably phenylacetylamino and the like, and $r_3$ also represents loweralkoxycarbonyl such as methoxycarbonyl, ethoxycarbonyl, propoxycarbonyl, isopropoxycarbonyl and the like. Other substituents which may be located on the aryl substituent of the compounds of Formula I are loweralkoxy-iminocarbonyl such as methoxyiminocarbonyl, ethoxyiminocarbonyl and the like, loweralkylamidino such as methylamidino, ethylamidino and the like, diloweralkylamidino such as dimethylamidino, diethylamidino, methylethylamidino and the like, and similar substituents.

It should be understood that the 1-unsubstituted nitroimidazoles discussed herein are compounds in which the nitro substituent is at either the 4 or 5 position on the imidazole nucleus. The hydrogen atom on a nitrogen in the imidazole ring is in the state of tautometric equilibrium and the result is an imidazole in which the 4 and 5 positions are equivalent. For convenience, these compounds are herein designated 4-nitroimidazoles.

In accordance with this invention, one method for preparing the novel 1-loweralkyl-2-aryl-5-nitroimidazoles described herein is depicted in the following flow diagram. $r_2$ and $r_3$ are as hereinabove defined and $r_6$ is loweralkyl.

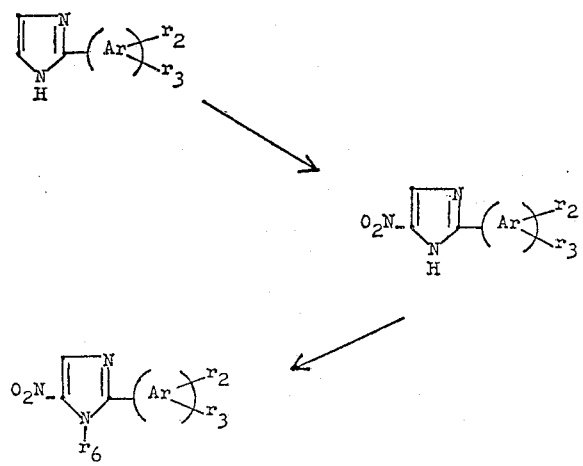

An important feature of the present invention is concerned with the manner of nitrating the 2-aryl imidazole starting compounds. Selective introduction of a nitro substituent on to the imidazole moiety and substantial elimination of aryl radical nitration is usually desired.

Certain reactants and reaction conditions have been found desirable in nitrating the starting compounds in the manner preferred. When nitration of a 2-aryl imidazole is carried out on a compound having an electro negative group on the aryl moiety thereof, it has been found that the use of concentrated nitric acid in sulfuric acid solvent affords a compound substituted only on the imidazole ring. For example, nitration using sulfuric and nitric acids produces a nitrosubstituted imidazole when a chloro, nitro or carboxamido substituent is affixed to the aryl radical of the starting aryl imidazole. Depending upon the particular reactants employed, reaction temperatures of the nitration may vary from about room temperature to a temperature as high as the reflux temperature of the acid mixture (about 150–160° C.). The reaction is normally completed in less than an hour and a 20 to 30 minute reaction time is often found to be sufficient. Temperature and reaction time are not critical when preparing these compounds according to the method described and it is only generally desirable to heat the reaction mixture in order that the rate of reaction be conveniently increased. When the formation of the desired nitroimidazole is complete, the product may be isolated and purified by known methods such as by filtration, extraction, removal of solvent under reduced pressure and crystallization of the residual heterocyclic compound.

The compounds which may be prepared according to the foregoing nitration procedure may be represented by the formula

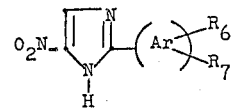

to it. The mixture is heated for 16 hours at 70° C., where Ar is aryl; $R_6$ is hydrogen, nitro, carboxamido, sulfonamido or amino; and $R_7$ is carboxy, amino, loweralkylamino, diloweralkylamino, nitro, sulfonamido, loweralkylsulfonamido, diloweralkylsulfonamido, cyano, carboxamido, loweralkylcarboxamido, diloweralkylcarboxamido, formyl, loweralkanoyl, carboxhydrazido, loweralkoxycarbonyl or loweralkylsulfonyl.

When in particular instances it is desired that nitration be effected on both the aryl and imidazole moieties, the use of concentrated sulfuric acid and concentrated nitric acid are employed. The reaction conditions are similar to those used when nitrating only the imidazole moiety except that at least 2 moles of nitric acid per mole of imidazole is utilized. For example, when 2-phenyl imidazole is treated with sufficient nitric and sulfuric acids, 2-(4'-nitrophenyl)-4-nitroimidazole results.

When a lower alkanoic acid or an anhydride thereof, such as acetic acid, propionic acid, butyric acid, acetic anhydride, propionic anhydride, butyric anhydride and the like is used in place of sulfuric acid as reaction medium in the above-described nitration reaction, those compounds, the aryl moiety of which would otherwise be nitrated, are selectively nitrated on the imidazole ring. Accordingly, the above-mentioned organic acids and anhydrides may be utilized when sulfuric acid as nitration solvent permits nitro substitution on the aryl moiety of the 2-aryl imidazole starting compounds. This change in reaction media permits a surprising degree of control over introduction of the nitro substituent to the imidazole ring. Substantially the same reaction conditions as those desired for the sulfuric acid medium are preferred. The tendency of a nitro group to attach to the imidazole rather than the aryl moiety is consequently effectively increased by the use of loweralkyl carboxylic acids or anhydrides thereof as solvents during nitration. It has been found that the organic compounds particularly useful as selective nitration solvents are acetic acid and acetic anhydride.

The compounds which may be prepared according to the above nitration procedure in which a lower alkanoic acid or a lower alkanoic anhydride is used as reaction medium may be represented by the formula

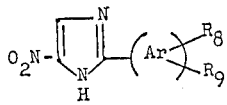

where Ar is aryl; R₈ is hydrogen, halo, carboxamido, nitro or loweralkoxy; and R₉ is hydrogen, loweralkyl, carboxy, aryl, halo, hydroxy, diloweralkylamino, nitro, diloweralkylsulfonamido, loweralkoxy, loweralkylthio, cyano, carboxamido, loweralkylcarboxamido, diloweralkylcarboxamido, formyl, loweralkanoyl, acylaminoloweralkyl, diloweralkylaminoloweralkyl, N′-morpholinoloweralkyl, N′-piperidinoloweralkyl, N′-pyrrolidinoloweralkyl, loweralkoxycarbonyl or loweralkylsulfonyl.

According to an additional aspect of the invention, nitronium perchlorate and certain nitronium metal fluorides have been found useful as nitrating agents in that they too cause nitro addition on the imidazole moiety in preference to the aryl ring. Nitronium salts comprising anions in a high oxidation state such as nitronium tetrafluoborate, nitronium hexafluorophosphate, nitronium hexafluoroarsenate, nitronium hexafluorosilicate, nitronium hexafluoroantimonate, nitronium perchlorate and the like, preferably nitronium tetrafluoborate, are useful for this purpose. The use of an inert solvent to bring the imidazole into solution is preferred. Solvents such as acetonitrile, chloroform, nitromethane, dichloroethane, tetramethylenesulfone and the like are suitable for this purpose. The nitration may be conducted at temperatures between about 0° C. and room temperature and above, preferably at about 10–20° C.

The general formula below represents those compounds which are preparable according to the nitration procedure discussed in the preceding paragraph.

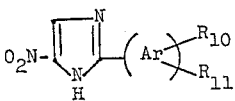

where Ar is aryl; R₁₀ is hydrogen, nitro or halo; and R₁₁ is hydrogen, loweralkyl, aryl, halo, nitro, dilower alkylsulfonamido, cyano, diloweralkylcarboxamido, formyl, loweralkanoyl, acylaminoloweralkyl, diloweralkylaminoloweralkyl, N′-morpholinoloweralkyl, N′-piperidinoloweralkyl, N′-pyrrolidinoloweralkyl, loweralkoxycarbonyl or loweralkylsulfonyl.

As illustrative of the compounds which may be prepared according to the foregoing nitration procedures, there may be mentioned 2-(4′-chlorophenyl)-4-nitroimidazole,
2-(2′-nitrophenyl)-4-nitroimidazole,
2-(3′,5′-dinitrophenyl)-4-nitroimidazole,
2-(4′-fluorophenyl)-4-nitroimidazole,
N′,N′-dimethyl-2-(4′-carboxamidophenyl)-4-nitroimidazole,
2-(4′-nitrophenyl)-4-nitroimidazole,
2-(3′-sulfonamidophenyl-4-nitroimidazole,
2-phenyl-4-nitroimidazole,
2-(2′,4′-dichlorophenyl)-4-nitroimidazole,
2-(3′-nitro-4′-chlorophenyl)-4-nitroimidazole,
2-(2′-fluorophenyl)-4-nitroimidazole,
2-(3′-nitrophenyl)-4-nitroimidazole,
N′-methyl-2-(4′-sulfonamidophenyl)-4-nitroimidazole,
2-(4′-actylphenyl)-4-nitroimidazole,
2-(3′-cyanophenyl)-4-nitroimidazole,
2-(2′-aminophenyl)-4-nitroimidazole, and
2-(2′-ethoxycarbonylphenyl)-4-nitroimidazole.

Certain of the compounds of the present invention are substituted at the 1-position on the imidazole moiety with a loweralkyl group by alkylating the 1-unsubstituted imidazoles with agents found useful for this purpose. Alkyl sulfates, preferably loweralkyl sulfates such as dimethyl sulfate, diethyl sulfate and the like, alkyl sulfonates, preferably loweralkyl sulfonates such as methyl benzenesulfonate, ethyl toluenesulfonate, methyl ethanesulfonate and the like, and diazoalkanes, preferably diazolower alkanes such as diazomethane, diazoethane and the like may be used in this regard. When preparation of 1-substituted-2-aryl-5-nitroimidazoles rather than 1-substituted-2-aryl-4-nitroimidazoles is desired using these reactants, the conditions under which the reaction is run is critical. It has now been found that 1-substituted-2-aryl-5-nitroimidazoles may be prepared in substantial yields with the above reagents only when the reaction medium is neutral or acidic. Accordingly, when dimethylsulfate is utilized to methylate 2-(2′-nitrophenyl)-4-nitroimidazole, the reaction is conducted under neutral conditions in order that the 5-nitroimidazole be obtained. The alkylation reactions using alkyl sulfate or alkyl sulfonate are generally conducted at temperatures of from about 100–200° C., either with or in the absence of solvent.

When solvent is used during alkylation with alkyl sulfate or alkyl sulfonate, the solvent is preferably inert with respect to the particular reactants employed. Typical examples of solvents useful for such alkylation reactions are loweralkanoic acids such as formic acid, acetic acid and the like, or mixed solvents such as loweralkanoic acid and dimethylformamide and the like.

When a loweralkyl sulfate or loweralkyl sulfonate is employed to obtain 1-loweralkyl-2-aryl-4-nitroimidazole, the reaction is run under basic conditions. The same considerations apply also when the substituent at the 1-position is to be other than 1-loweralkyl. Inasmuch as the 1-substituted-2-aryl-5-nitroimidazoles of this invention display somewhat greater parisiticidal properties than the corresponding 1-substituted-2-aryl-4-nitroimidazoles, a choice of reaction conditions is an important aspect of this invention.

The 1-loweralkyl-2-aryl-nitroimidazoles which may be prepared according to the above-described alkylation processes have the general formulae

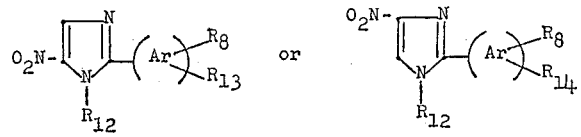

where Ar is aryl; R₁₂ is loweralkyl; R₈ is hydrogen, nitro, halo, carboxamido or loweralkoxy; R₁₃ is hydrogen, loweralkyl, carboxy, aryl, halo, hydroxy, nitro, diloweralkylsulfonamido, loweralkoxy, loweralkylthio, cyano, carboxamido, loweralkylcarboxamido, diloweralkylcarboxamido, formyl, loweralkanoyl, acylaminoloweralkyl, hydroxyloweralkyl, loweralkoxycarbonyl or loweralkylsulfonyl; and R₁₄ is hydrogen, loweralkyl, carboxy, aryl, halo, nitro diloweralkylsulfonamido, loweralkoxy, loweralkylthio, cyano, carboxamido, loweralkylcarboxamido, diloweralkylcarboxamido, formyl, loweralkanoyl, acylaminoloweralkyl, hydroxyloweralkyl, loweralkoxycarbonyl or loweralkylsulfonyl.

It has also now been discovered that 1-substituted 2-aryl-5-nitroimidazoles are prepared in neutral medium when diazoalkane, preferably lower diazoalkane such as diazomethane, diazoethane and the like is used as alkylating agent. The reagent may be dissolved in inert organic solvent such as ethers, for example diethyl ether, 1,2-dimethoxyethane, tetrahydrofuran and the like, hydrocarbons such as benzene, toluene, xylene and the like, halogenated hydrocarbons such as chloroform and the like, and lower alkanols such as ethanol, propanol and the like. The nitroimidazole is then conveniently treated with the resulting solution at a temperature preferably from about 0° C. to about room temperature in order that 1-alkyl-2-aryl-5-nitroimidazole be produced.

The compounds which may be prepared according to the foregoing alkylation procedure may be represented by the formula

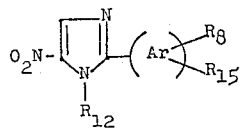

where Ar is aryl; $R_{12}$ is loweralkyl; $R_8$ is hydrogen, halo, nitro, carboxamido or loweralkoxy; and $R_{15}$ is hydrogen, loweralkyl, aryl, halo, loweralkylamino, diloweralkylamino, nitro, diloweralkylsulfonamido, loweralkoxy, loweralkylthio, cyano, carboxamido, loweralkylcarboxamido, diloweralkylcarboxamido, acylaminoloweralkyl, loweralkylaminoloweralkyl, diloweralkylaminoloweralkyl, N′ - morpholinoloweralkyl, N′ - piperidinoloweralkyl, N′-pyrrolidinoloweralkyl, hydroxyloweralkyl, loweralkoxycarbonyl or loweralkylsulfonyl.

According to the present invention, it has now been found that 2-sulfonamidoaryl-4-nitroimidazole is prepared from 2-aryl-4-nitroimidazole by treating the latter with chlorosulfonic acid at a temperature preferably above room temperature for a time greater than about 24 hours. The crude reaction product is then treated with a source of ammonia, at a temperature of about −30° C. to about 100° C. preferably about 0° C. to about 10° C. to obtain the desired 2-sulfonamidoaryl-4-nitroimidazole. Ammonium hydroxide, anhydrous ammonia and the like, preferably ammonium hydroxide are useful to supply the necessary ammonia. The use of loweralkyl substituted amines, e.g. dimethylamine, in place of an ammonia source give the corresponding N′-loweralkyl or N′,N′-diloweralkyl-2-sulfonamidoaryl-4-nitroimidazole.

When the preparation of 2-(aminoaryl)-4-nitroimidazole is undertaken, the compound may be prepared from 2-(nitroaryl)-4-nitroimidazole by treatment with hydrogen sulfide and ammonia. The reaction temperature is not critical but a reaction temperature above about 50° C. is preferred to reduce reaction time. The reaction mixture is then acidified by convenient means preferably by addition of a strong mineral acid such as hydrochloric acid. The sulfur precipitate is then removed by filtration and the product is extracted by conventional means such as by use of inert organic solvent such as ethyl acetate. When this product is to be substituted at the 1-position, the usual practice of protecting an amino group by acylation is carried out. The 1-substituted-2-(aminoaryl) nitroimidazole is then conveniently obtained by hydrolyzing the acylated aminoaryl compound with a mineral acid such as hydrochloric acid.

The following compounds are illustrative of those which may be prepared according to the foregoing processes:

1-methyl-2-phenyl-5-nitroimidazole,
1-methyl-2-(4′-tolyl)-5-nitroimidazole,
1-methyl-2-(3′-tolyl)-4-nitroimidazole,
1-methyl-2-(2-β-chloroethylphenyl)-5-nitroimidazole,
1-methyl-2-(3-β-fluoropropylphenyl)-5-nitroimidazole,
1-methyl-2-(3′-nitrophenyl)-4-nitroimidazole,
1-methyl-2-(2′-cyanophenyl)-5-nitroimidazole,
1-methyl-2-(4′-formylphenyl)-5-nitroimidazole,
1,N′-dimethyl-2-(2′-aminomethylphenyl)-5-nitroimidazole,
1,N′,N′-trimethyl-2-(3′-sulfonamidophenyl)-4-nitroimidazole,
1-methyl-2-(4′-bromophenyl)-5-nitroimidazole,
1-methyl-2-(3′-acetylaminophenyl)-5-nitroimidazole,
1-n propyl-2-(4′-biphenylyl)-4-nitroimidazole,
1-methyl-2-(4′-methylsulfonylphenyl)-5-nitroimidazole,
1-methyl-2-(2′-aminophenyl)-5-nitroimidazole,
1-methyl-2-(3′-aminophenyl)-5-nitroimidazole,
1-ethyl-2-(4′-aminophenyl)-5-nitroimidazole,
1-methyl-2-(3′-fluorophenyl)-5-nitroimidazole,
1-methyl-2-(2′-chlorophenyl)-5-nitroimidazole,
1-methyl-2-(4′-chlorophenyl)-4-nitroimidazole,
1-methyl-2-(4′-morpholinomethylphenyl)-5-nitroimidazole,
1-methyl-2-(3′-methylthiophenyl)-5-nitroimidazole,
1-methyl-2-(2′-carboxamidophenyl)-5-nitroimidazole,
1-methyl-2-(2′-iodophenyl)-5-nitroimidazole,
1-methyl-2-(4′-nitrophenyl)-4-nitroimidazole,
1-ethyl-2-(2′-nitrophenyl)-5-nitroimidazole,
1-isopropyl-2-(4′-fluorophenyl)-5-nitroimidazole,
1-methyl-2-(3′-piperidinomethylphenyl)-5-nitroimidazole,
1-methyl-2-(4′-acetylaminoethylphenyl)-4-nitroimidazole,
1-methyl-2-(3′-ethoxyphenyl)-5-nitroimidazole,
1-methyl-2-(2′-nitro-3′-chlorophenyl)-5-nitroimidazole,
1-ethyl-2-(2′-chloro-4′-methylphenyl)-5-nitroimidazole,
1-ethyl-2-(4′-nitrophenyl)-5-nitroimidazole,
1-ethyl-2-(4′-chloro-2′-aminophenyl)-5-nitroimidazole,
1-propyl-2-(3′-methoxyphenyl)5-nitroimidazole,
1-propyl-2-(2′-nitro-3′-sulfonamidophenyl)-5-nitroimidazole,
1-methyl-2-(2′-chloro-4′-pyrrolidinomethylphenyl)-5-nitroimidazole,
1-methyl-2-(3′-methyl-4′-carboxamidophenyl)-5-nitroimidazole,
1,N′-dimethyl-2-(4′-carboxamidophenyl)-5-nitroimidazole,
1-methyl-N′-ethyl-2-(2′-sulfonamidophenyl)-5-nitroimidazole,
1-methyl-2-(4′-ethoxycarbonylphenyl)-5-nitroimidazole,
1-methyl-2-(2′,4′-dichlorophenyl)-5-nitroimidazole,
1-methyl-2-(2′,4′-difluorophenyl)-5-nitroimidazole,
1-methyl-2-(2′-aminopropylphenyl)-4-nitroimidazole,
1,N′-diethyl-2-(4′-aminophenyl)-5-nitroimidazole,
1,N′-dimethyl-2-(4′-sulfonamidophenyl)-5-nitroimidazole,
1,N′,N′-trimethyl-2-(4′-aminophenyl)-5-nitroimidazole,
1-methyl-N′-ethyl-2-(3′-nitro-4′-sulfonamidophenyl)-5-nitroimidazole,
1-methyl-2-(3′-acetylphenyl)-5-nitroimidazole,
1-methyl-2-(3′-ethylphenyl)-5-nitroimidazole,
1-methyl-2-(2′-propylphenyl)-5-nitroimidazole,
1-ethyl-3-(4′-β-fluoroethylphenyl)-5-nitroimidazole,
1-methyl-2-(2′-chloronaphthyl)-5-nitroimidazole,
1-methyl-2-(3′-fluoronaphthyl)-5-nitroimidazole,
1-methyl-2-(5′-fluoronaphthyl)-5-nitroimidazole,
1-methyl-2-(3′-nitronaphthyl)-5-nitroimidazole,
1-methyl-2-(2′-aminonaphthyl)-4-nitroimidazole,
1-ethyl-2-(2′,3′-dichloronaphthyl)-5-nitroimidazole,
1-ethyl-2-(2′-methylnaphthyl)-5-nitroimidazole,
1-methyl-2-(3′-carboxamidonaphthyl)-5-nitroimidazole, and
1-ethyl-2-naphthyl-5-nitroimidazole.

When the 1-haloloweralkyl-2-aryl-5-nitroimidazoles of the present invention are prepared by halo alkylation of a 2-aryl nitroimidazole, substantially identical reaction conditions as those used for the alkylation reactions are satisfactory. No significant difference between use of the alkylating or halo alkylating agent is necessary to achieve a corresponding result. Consequently, when a haloloweralkyl sulfate such as 2- chloroethyl sulfate, 3-chloropropyl sulfate and the like, or a haloloweralkyl sulfonate such as 2-chloroethyltoluene sulfonate and the like, or a halodiazoloweralkane such as 2-chloro-1-diazoethane and the like is used in treating the 2-aryl-4-nitroimidazole of the invention, a 1-haloloweralkyl-2-aryl-5-nitroimidazole or 1-haloloweralkyl-2-aryl-4-nitroimidazole will result.

The 1-haloloweralkyl-2-aryl-nitroimidazoles capable of the preparation according to the foregoing have the formula

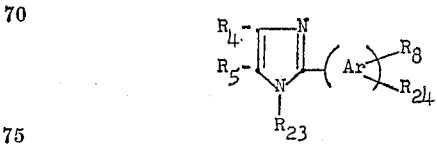

where Ar is aryl; $R_{23}$ is haloalkyl; $R_8$ is hydrogen, halo, nitro, carboxamido or loweralkoxy; $R_{24}$ is hydrogen, loweralkyl, carboxy, aryl, halo, hydroxy, nitro, carboxamido, loweralkoxy, loweralkylthio, formyl, loweralkanoyl, acylaminoloweralkyl, diloweralkylsulfonamido, hydroxyloweralkyl, loweralkoxycarbonyl or loweralkylsulfonyl; and $R_4$ and $R_5$ are hydrogen or nitro, provided one and only one of $R_4$ and $R_5$ is nitro.

The 1-loweralkoxyloweralkyl or 1-hydroxyloweralkyl-2-aryl-5-nitroimidazoles of this invention may be prepared by reacting a 2-aryl-4-nitroimidazole and an aryl sulfonate such as a loweralkoxyloweralkyl toluene sulfonate or the like at moderate temperature, preferably about 150° C. to about 200° C. Loweralkoxyloweralkyl sulfates are also useful reagents in this regard. Standard extraction methods may then be utilized to obtain the 1-loweralkoxyloweralkyl-2-aryl-5-nitroimidazole. Hydrolysis of the 1-loweralkoxyloweralkyl-2-aryl-5-nitroimidazoles by treatment, for example, with a strong mineral acid such as sulfuric acid converts that compound to the corresponding 1-hydroxyloweralkyl-5-nitroimidazole. The 1-substituted-2-aryl-4-nitroimidazoles are obtained when the reaction medium is basic. As illustrative of the aryl sulfonates useful in the above reaction, there may be mentioned methoxyethyltoluene sulfonate, ethoxyethyltoluene sulfonate, propoxyethyltoluene sulfonate, ethoxypropylbenzene sulfonate and the like, whereas among the loweralkoxyloweralkyl sulfates useful as reagents in the above-described process, there may be mentioned di(ethoxyethyl)sulfate, di(ethoxypropyl)sulfate, di(methoxyethyl) sulfate and the like. Loweralkoxy diazoloweralkanes such as methoxydiazoethane, ethoxydiazoethane and the like are also useful in preparing the 1-loweralkoxyloweralkyl and 1-hydroxyloweralkyl-2-aryl-5-nitroimidazole in accordance with the above-described process.

The compounds prepared according to the loweralkoxyalkylation and hydroxyalkylation processes described above may be represented by the formulae

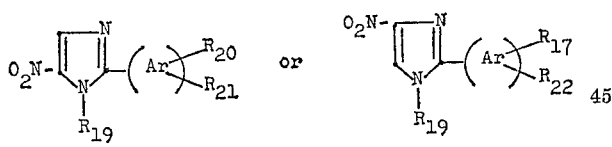

when Ar is aryl; $R_{19}$ is $(CH_2)_nY$, where $n$ is 2–4 and Y is hydroxy or loweralkoxy; $R_{20}$ is hydrogen, halo, nitro or loweralkoxy; $R_{21}$ is hydrogen, loweralkyl, carboxy, aryl, halo, hydroxy, nitro, loweralkoxy, loweralkylthio, formyl, loweralkanoyl, acylaminoloweralkyl, diloweralkylsulfonamido, hydroxyloweralkyl, loweralkoxycarbonyl or loweralkylsulfonyl; $R_{17}$ is hydrogen, halo, nitro, amino or loweralkoxy; and $R_{22}$ is hydrogen, loweralkyl, carboxy, aryl, halo, nitro, amino, loweralkoxy, loweralkylthio, formyl, loweralkanoyl, acylaminoloweralkyl, diloweralkylaminoloweralkyl, diloweralkylsulfonamido, hydroxyloweralkyl, loweralkoxycarbonyl or loweralkylsulfonyl.

As illustrative of some specific compounds which may be prepared according to the processes described above, there may be mentioned: 1-(2′-chloroethyl)-2-(4′-chlorophenyl)-5-nitroimidazole, 1-(2′-hydroxyethyl)-2-(4′-nitrophenyl)-5-nitroimidazole, 1-(2′-chloroethyl)-2-phenyl-5-nitroimidazole, 1-(3′-hydroxypropyl)-2-(3′-methylthiophenyl)-4-nitroimidazole, 1-(2′-bromoethyl)-2-(biphenylyl)-5-nitroimidazole, 1-(2′-hydroxyethyl)-2-(3′,4′-dichlorophenyl)-5-nitroimidazole, 1-(2′-fluoroethyl)-2-(4′-fluorophenyl)-5-nitroimidazole, 1-(2′-hydroxyethyl)-2-(3′-tolyl)-5-nitroimidazole, 1-(2′-hydroxyethyl)-2-(2′-nitrophenyl)-4-nitroimidazole, 1-(3′-fluorophenyl)-2-(3′-ethoxycarbonylphenyl)-5-nitroimidazole, 1-(2′-hydroxyethyl)-2-(4′-methylsulfonylphenyl)-5-nitroimidazole, 1-(2′-chloroethyl)-2-(4′-acetylaminomethylphenyl)-5-nitroimidazole, 1-(2′-chloroethyl)-2-(4′-carboxyphenyl)-5-nitroimidazole and 1-(2′-hydroxyethyl)-2-(3′-formylphenyl)-4-nitroimidazole.

The 2-aryl imidazoles employed as starting materials in the present invention may be prepared according to synthetic methods presently known in the literature. One method for preparing these compounds involves reaction of an appropriately substituted aromatic nitrile such as benzonitrile with a loweralkanol and a strong mineral acid. This reaction is preferably conducted at about 0–10° C. for up to about 14 days depending on the reactants used. The resulting product, a loweralkyl aryl imidate hydrochloride, is then treated with an amino acetaldehyde acetal in a suitable solvent, preferably a loweralkanol such as methanol at temperatures ranging from about 0° C. to room temperature. These temperatures are determined according to the particular reactants used. This reaction may be generally represented as follows:

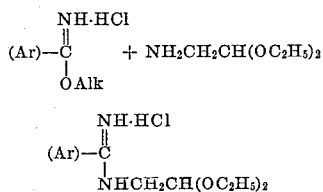

Treatment of the resulting amidine with acid such as a concentrated mineral acid and then with a base such as a lower alkali or a lower alkaline earth metal hydroxide produces the 2-aryl imidazole desired.

As an additional aspect of the invention, it has now been found that compounds having the general formula (II) below are prepared from aromatic starting materials having two ortho positioned cyano groups.

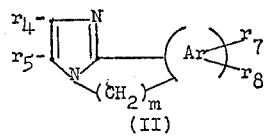

(II)

The symbol $m$ in the formula has a value of 1–2, $r_4$ and $r_5$ are hydrogen or nitro, provided that one and only one of $r_4$ and $r_5$ is nitro; $r_7$ is hydrogen, nitro, halo, carboxamido, sulfonamido, amino or loweralkoxy; and $r_8$ is hydrogen, carboxy, aryl, halo, hydroxy, loweralkylamino, diloweralkylamino, nitro, sulfonamido, loweralkylsulfonamido, diloweralkylsulfonamido, cyano, carboxamido, loweralkylcarboxamido, diloweralkylcarboxamido, formyl, loweralkanoyl, loweralkyl, loweralkylaminoloweralkyl, diloweralkylaminoloweralkyl, N′-morpholinoloweralkyl, N′-piperidinoloweralkyl, N′-pyrrolidinoloweralkyl, hydroxyloweralkyl or loweralkylsulfonyl.

The first step in preparing the above compounds involves reaction with a loweralkanol and hydrogen chloride. The reaction is preferably conducted at about 0–10° C. The resulting product is a loweralkyl o-cyanoaryl imidate hydrochloride which is then treated with amino acetal in solvent, preferably a loweralkanol such as methanol. The temperature is not critical but room temperature is preferred. The resulting o-cyanoaryl amidine is then converted to the corresponding 2-(o-carboxyaryl) imidazole by treatment with a strong acid, preferably concentrated mineral acid such as sulfuric acid. This product is then nitrated on the imidazole ring using a nitrating agent such as fuming nitric acid in a mineral acid, preferably sulfuric acid. The process conditions are like those previously described for the nitric acid sulfuric acid nitration.

The carboxylic acid on the substituent is then reduced to hydroxymethyl by the use of a selective reducing agent such as diborane. Treatment of the 2-(2'-hydroxymethylaryl)-4-nitroimidazole product with a halogenating agent such as thionyl chloride produces a 2-(2'-halomethylaryl)-4-nitroimidazole which is then converted to the desired isoindole by heating at about 100° C. to 160° C. for about 1 to 30 minutes. Addition of a cyano substituent to the 2-halomethylaryl nitroimidazole intermediate according to procedures established in the art and further treatment according to the method above described produces 2-(2'-haloethylaryl)-4-nitroimidazole which upon cyclization gives a corresponding dihydroisoquinoline.

As illustrative of some of the isoindoles and dihydroisoquinolines preparable according to the above procedure, there may be mentioned 3-nitro-7(or 8)-fluoroimidazo-[2,1:a]-isoindole, 3-nitro-7(or 8)-chloroimidazo-[2,1:a]-isoindole, 3,7(or 8)-dinitroimidazo-[2,1:a]-isoindole, 3-nitroimidazo-[2,1:a]-isoindole, 3-nitro-7(or 8)-carboxamidoimidazo-[2,1:a]-isoindole, 3-nitro-7(or 8)-formylimidazo-[2,1:a]-isoindole, 3 - nitro - 7(or 8) - methylimidazo-[2,1:a]-isoindole, 3-nitro - 7(or 8) - sulfonamidoimidazo-[2,1:a]-isoindole, 3-nitro-5,6-dihydroimidazo-[2,1:a]-isoquinoline, 3-nitro - 5,6 - dihydro - 8(or 9) - fluoroimidazo-[2,1:a]-isoquinoline, 3-nitro-5,6-dihydro-8(or 9)-nitroimidazo-[2,1:a]-isoquinoline and 3-nitro-5,6-dihydro-8(or 9)-phenylimidazo-[2,1:a]-isoquinoline.

The 1-substituted-2-aryl - 5 - nitroimidazoles, 1 - substituted-2-aryl-4-nitroimidazoles, and structurally related isoindoles and dihydroisoquinolines of this invention are effective in the control of enterohepatitis in turkeys. For this purpose they may be administered to turkeys mixed with an element of turkey sustenance, e.g., feed or drinking water. Good control of the disease is obtained when the imidazole compounds of the invention are incorporated in a turkey feed ration at levels of from about 0.003% to about 0.1% by weight and preferably from about 0.006% to 0.05% by weight of the feed. The optimum concentration will depend to a large extent on the age of the birds, the severity of the infection and the particular compound employed. With these feed levels good control of the disease is obtained with no or minimal side effects of growth retardation of the turkeys.

When the poulary feed or poultry ration is employed as carrier for the active compounds of the present invention, it is desired that the drug be uniformly mixed throughout the feed. This may be accomplished by first preparing a premix or feed supplement composition wherein the active ingredient is present in concentrations of from about 1% to about 50% by weight and where the carrier diluent is a nontoxic orally ingestible carrier. It is preferred that the carrier be a nutritive one, for example corn distillers dried grains, corn gluten feed, corn cob meal, edible vegetable substances, condensed fish solubles, brewers yeast, whey, alfalfa, citrus meal, molasses solubles, soybean mill feed, antibiotic mycelia, toasted dehulled soya flour, soya grits, wheat shorts, wheat middlings, soybean meal, fermentation residues or corn meal. The supplements or premixed are then intimately and uniformly mixed with the remainder of the poultry ration by conventional techniques such as grinding or milling.

When the active compounds are administered by way of drinking water of the poultry which method is preferred when the birds are severely infected (the birds will normally continue to drink after they have stopped eating solid food), somewhat higher dose levels are employed than when administered with solid feed. The quantities of active agent which are useful are those in which from about 0.01% to about 0.1% by weight of water are utilized. Some of the nitroimidazoles of the invention are not highly water soluble and when such compounds are added to drinking water it is desirable that suspending or emulsifying agents also be used to render the compound more effective in such form. A water soluble form of the drug may be utilized in a similar fashion.

The feed levels at which representative members of the compounds of the invention are active in controlling histomoniasis in turkeys are as follows:

| Compound: | Percent by weight in feed |
|---|---|
| 1-methyl-2-phenyl-5-nitroimidazole | .025 |
| 1-methyl-2-(2'-nitrophenyl)-5-nitroimidazole | .0125 |
| 1-methyl-2-(3'-nitrophenyl)-5-nitroimidazole | .0125 |
| 1-methyl-2-(4'-nitrophenyl)-5-nitroimidazole | .006 |
| 1-methyl-2-(4'-chlorophenyl)-5-nitroimidazole | .025 |
| 1-methyl-2-(4'-aminophenyl)-5-nitroimidazole | 0.25 |
| 1-methyl-2-(3'-sulfonamidophenyl)-5-nitroimidazole | .025 |
| 1-methyl-2-(4'-fluorophenyl)-5-nitroimidazole | .006 |
| 1-methyl-2-(3',5'-dinitrophenyl)-5-nitroimidazole | 0.25 |

As previously stated, the 1-substituted-2-aryl-5-nitromidazoles, 1 - substituted-2-aryl-4-nitroimidazoles, and structurally related isoindoles and dihydroisoquinolines described herein also have a significant degree of antitrichomonal activity. When employed in treating trichomoniasis, they may be administered orally in unit dosage form, for instance as tablets or capsules. Such unit dosage forms containing from about 100 to about 500 mg. of active antitrichomonal ingredient are quite satisfactory and are prepared by techniques known to those skilled in the pharmaceutical art. Thus, these unit dosage forms will contain the normal diluents, excipients, lubricating agents and extenders regularly employed in compounding such forms.

Alternatively, the drugs may be suspended or dissolved in liquid vehicles designed for oral administration. The final preparation may be in the form of a solution, emulsion, suspension, syrup or the like and may be adapted for ultimate use by known methods with conventional excipients, diluents, wetting agents or other additives.

The 1-substituted-2-aryl-5(or 4)-nitroimidazoles of the present invention are also useful as topical trichomonacides. When employing the compounds in this manner, one or more of the active agents are uniformly distributed in a suitable chemotherapeutic vehicle that is chemically compatible with the particular compound selected, noninhibiting with respect to the action of the effective agent upon *Trichomonas vaginalis* and essentially noninjurious to body tissue under the conditions of use. The vehicle is preferably a semi-liquid or semi-solid type and the final preparation may be in the form of a suppository, if desired.

Oil and water types of emulsions or creams as well as aqueous jellies such as those prepared with the aid of any of a number of commercially used jelling agents including acacia, tragacanth, bentonite, alginic acid and the like are suitable vehicles. The vehicle may also be a viscous aqueous jell containing one or more cellulose derivatives such as methyl cellulose, hydroxyethyl cellulose, and sodium carboxy methyl cellulose. Jelling agents such as pectin, gum tragacanth, sodium alginate and other vegetable jelling agents are also useful vehicles in this regard.

The compounds preferred for use against *T. vaginalis* vaginitis are set forth below. The activity indicated is that displayed in vivo in mice infested with the protozoal infection. Activity is expressed in terms of mg./kg. as determined by the method described in Cuckler, Kupferberg and Millman, "Chemotherapeutic and Tolerance Studies on Amino-Nitro Thiazoles," Antibiotics & Chemotherapy, 10, 540–550, 1955.

| Compound: | Activity (mg./kg.) |
|---|---|
| 1-methyl-2-phenyl-5-nitroimidazole | 40 |
| 1-methyl-2-(2'-nitrophenyl)-5-nitroimidazole | 10 |
| 1-methyl-2-(3'-nitrophenyl)-5-nitroimidazole | 10 |
| 1-methyl-2-(4'-nitrophenyl)-5-nitroimidazole | 20 |
| 1-methyl-2-(4'-chlorophenyl)-5-nitroimidazole | 20 |
| 1-methyl-2-(4'-aminophenyl)-5-nitroimidazole | 60 |
| 1 - methyl-2-(3'-sulfonamidophenyl)-5-nitroimidazole | 40 |
| 1,N',N' - trimethyl-2-(4'-sulfonamidophenyl)-5-nitroimidazole | 40 |
| 1 - methyl-2-(2',4'-dinitrophenyl)-5-nitroimidazole | 100 |
| 1-methyl-2-(4'-fluorophenyl)-5-nitroimidazole | 5 |
| 1 - methyl-2-(4'-carboxamidophenyl)-5-nitroimidazole | 40 |
| 1 - methyl-2-(3',4'-dichlorophenyl)-5-nitroimidazole | 33 |
| 1 - (2'-hydroxyethyl)-2-(4'-fluorophenyl)-5-nitroimidazole | 10 |
| 1-methyl-2-(4'-fluorophenyl)-4-nitroimidazole | 20 |
| 3-nitroimidazo-[2,1:a]-isoindole | 20 |
| 3,7(or 8)-dinitroimidazo-[2,1:a]-isoindole | 20 |

The following examples are given for the purpose of illustration and not by way of limitation.

Example 1.—2-phenyl-4-nitroimidazole 311.5 gm. (2.16 mol) of 2-phenyl imidazole in 800 ml. of stirred, ice-cooled chloroform is treated in small portions over about one hour with 156.1 gm. (1.17 mol) of nitronium fluoborate. The rate of addition is such to maintain the temperature of the reaction mixture at 10–20° C. The mixture is further stirred for two hours at room temperature and poured into 2.5 l. of .5 N aqueous sodium hydroxide. The chloroform phase is extracted twice with 400 ml. of .5 N sodium hydroxide and the combined basic extracts are made acidic with concentrated hydrochloric acid. The precipitated material in the acidic solution is extracted three times with chloroform, leaving a clear aqueous phase and a dark viscous insoluble oil. 25.5 gm. of insoluble oil is isolated by decantation of the aqueous supernatant. This is combined in 600 ml. acetone with the 31.2 gm. of partially crystalline material obtained by evaporation of the combined chloroform extracts. The acetone solution is diluted with sufficient ether to cause heavy cloudiness and is chromatographed over an intimate mixture of 120 gm. decolorizing charcoal and 120 gm. Supercel using first 1:1 (v./v.) acetone-ether and then acetone as eluting solvents. After evaporation of the eluate, the residue is recrystallized from methanol-water to give 2-phenyl-4-nitroimidazole; M.P. 235–242° C. An analytical sample obtained by recrystallization and sublimation melts at 243.5–244.5° C.

2-phenyl-4-nitroimidazole is also obtained when nitronium hexafluorophosphate, nitronium hexafluoroarsenate, nitronium hexafluorosilicate, nitronium hexafluoroantimonate or nitroniumperchlorate is used in place of nitronium fluoborate in the above reaction.

When the above procedure is carried out using 2-(4'-tolyl) imidazole in place of 2-phenyl imidazole, there is obtained 2-(4'-tolyl)-4-nitroimidazole; M.P. 235–237° C.

When the above process is carried out and 2-(4'-biphenylyl) imidazole,
2-(4'-fluorophenyl) imidazole,
2-(3'-nitrophenyl) imidazole,
N',N'-dimethyl-2-(3'-sulfonamidophenyl) imidazole,
2-(4'-cyanophenyl) imidazole,
N',N'-dimethyl-2-(4'-carboxamidophenyl) imidazole,
2-(4'-formylphenyl) imidazole,
2-(2'-acetylphenyl) imidazole,
2-(4'-acetylaminomethylphenyl) imidazole,
N',N'-diethyl-2-(4'-aminomethylphenyl) imidazole,
2-(4'-N'-morpholinomethylphenyl) imidazole,
2-(4'-N'-piperidinomethylphenyl) imidazole,
2-(4'-N'-pyrrolidinomethylphenyl) imidazole,
2-(2'-methoxycarbonylphenyl) imidazole or
2-(4'-methylsulfonylphenyl) imidazole is used in place of 2-phenyl imidazole, there is obtained 2-(4'-biphenylyl)-4-nitroimidazole,
2-(4'-fluorophenyl)-4-nitroimidazole,
2-(3'-nitrophenyl)-4-nitroimidazole,
N',N'-dimethyl-2-(3'-sulfonamidophenyl)-4-nitroimidazole,
2-(4'-cyanophenyl)-4-nitroimidazole,
N',N'-dimethyl-2-(4'-carboxamidophenyl)-4-nitroimidazole,
2-(4'-formylphenyl)-4-nitroimidazole,
2-(2'-acetylphenyl)-4-nitroimidazole,
2-(4'-acetylaminomethylphenyl)-4-nitroimidazole,
N',N'-diethyl-2-(4'-aminomethylphenyl)-4-nitroimidazole,
2-(4'-N'-morpholinomethylphenyl)-4-nitroimidazole,
2-(4'-N'-piperidinomethylphenyl)-4-nitroimidazole,
2-(4'-N'-pyrrolidinomethylphenyl)-4-nitroimidazole,
2-(2'-methoxycarbonylphenyl)-4-nitroimidazole or
2-(4'-methylsulfonylphenyl)-4-nitroimidazole, respectively.

Example 2.—1-methyl-2-phenyl-5-nitroimidazole 143 mg. (.76 mmol) of 2-phenyl-4-nitroimidazole and 99 mg. (.79 mmol) of methyl sulfate are heated together at 120° C. for 30 minutes. The reaction mixture is cooled and dissolved by shaking with a mixture of 3 ml. of dilute aqueous sodium hydroxide and 3 ml. of chloroform. The chloroform phase is dried over sodium sulfate and evaporated to dryness yielding crystalline 1-methyl-2-phenyl-5-nitroimidazole. After recrystallization from ethyl acetate this material melts at 157–160° C. After further recrystallization and sublimation, the melting points is 160–161° C.

When the above process is carried out using 2-(4'-tolyl)-4-nitroimidazole in place of 2-phenyl-4-nitroimidazole, there is obtained 1-methyl-2-(4'-tolyl)-5-nitroimidazole; M.P. 138–40° C.

When the above process is carried out using β-chloroethyl sulfate in place of methyl sulfate, there is obtained 1-β-chloroethyl-2-phenyl-5-nitroimidazole.

The substitution of ethyl sulfate for methyl sulfate in the above reaction affords 1-ethyl-2-(4'-fluorophenyl)-5-nitroimidazole as the product.

When the above process is carried out and 2-(4'-tolyl)-4-nitroimidazole,
2-(4'-carboxyphenyl)-4-nitroimidazole,
2-(4'-biphenylyl)-4-nitroimidazole,
2-(4'-fluorophenyl)-4-nitroimidazole,
2-(2'-hydroxyphenyl)-4-nitroimidazole,
2-(2'-nitrophenyl)-4-nitroimidazole,
N',N'-dimethyl-2-(3'-sulfonamidophenyl)-4-nitroimidazole,
2-(2'-ethoxyphenyl)-4-nitroimidazole,
2-(4'-methylthiophenyl)-4-nitroimidazole,
2-(2'-cyanophenyl)-4-nitroimidazole,
2-(4'-carboxamidophenyl)-4-nitroimidazole,
N'-methyl-2-(4'-carboxamidophenyl)-4-nitroimidazole,
N',N'-dimethyl-2-(4'-carboxamidophenyl)-4-nitroimidazole,
2-(2'-formylphenyl)-4-nitroimidazole,
2-(2'-acetylphenyl)-4-nitroimidazole,
2-(2'-acetylaminomethylphenyl)-4-nitroimidazole,
2-(2'-hydroxymethylphenyl)-4-nitroimidazole,
2-(4'-ethoxycarbonylphenyl)-4-nitroimidazole or
2-(2'-methylsulfonylphenyl)-4-nitroimidazole is used in place of 2-phenyl-4-nitroimidazole, there is obtained 1-methyl-2-(4'-tolyl)-5-nitroimidazole,
1-methyl-2-(4'-carboxyphenyl)-5-nitroimidazole, 1methyl-2-(4'-biphenylyl)-5-nitroimidazole,
1-methyl-2-(4'-fluorophenyl)-5-nitroimidazole,
1-methyl-2-(2'-hydroxyphenyl)-5-nitroimidazole,
1-methyl-2-(2'-nitrophenyl)-5-nitroimidazole,
1-N',N'-trimethyl-2(3'-sulfonamidophenyl)-5-nitroimidazole,
1-methyl-2-(2'-ethoxyphenyl)-5-nitroimidazole,
1-methyl-2-(4'-methylthiophenyl)-5-nitroimidazole,
1-methyl-2-(2'-cyanophenyl)-5-nitroimidazole,
1-methyl-2-(4'-carboxamidophenyl)-5-nitroimidazole,
1-N'-dimethyl-3-(4'-carboxamidophenyl)-5-nitroimidazole,
1-N',N'-trimethyl-2-(4'-carboxamidophenyl)-5-nitroimidazole,
1-methyl-2-(2'-formylphenyl)-5-nitroimidazole,
1-methyl-2-(2'-acetylphenyl)-5-nitroimidazole,
1-methyl-2-(2'-acetylaminomethylphenyl)-5-nitroimidazole,
1-methyl-2-(2'-hydroxymethylphenyl)-5-nitroimidazole,
1-methyl-2-(4'-ethoxycarbonylphenyl)-5-nitroimidazole, or
1-methyl-2-(2'-methylsulfonylphenyl)-5-nitroimidazole, respectively.

When the above processes are carried out using methyl toluene sulfonate in place of methyl sulfate, the corresponding 1-methyl-2-aryl-5-nitroimidazole again results.

When di(β-chloroethyl)sulfate or β-chloroethyl toluene sulfonate is used in place of methyl sulfate in the above processes, the corresponding 1-(2'-chloroethyl)-2-aryl-5-nitroimidazoles are obtained.

Example 3.—2-(4'-fluorophenyl)-4-nitroimidazole

To 1 l. of ethanol saturated with hydrogen chloride is added 75 gm. of p-fluorobenzonitrile. The resulting solution is allowed to stand overnight in an ice bath. The ethanol is then evaporated in vacuo giving ethyl-4-fluorobenzimidate hydrochloride.

To 10 gm. of the imino ether in 10 ml. of methanol is added 6.65 gm. of amino acetaldehyde diethyl acetal in 10 ml. of methanol. The resulting solution is allowed to stand at room temperature for 24 hours and is then evaporated in vacuo. Concentrated sulfuric acid (14.5 gm.) is added dropwise with stirring to the oil residue in an ice bath. The mixture is slowly warmed to room temperature and then quenched over ice and concentrated sodium hydroxide. The mixture is then extracted with chloroform and evaporated. The residue is dissolved in hot benzene and treated with charcoal and evaporated to dryness. The oily residue is dissolved in acetone, treated with charcoal, filtered while warm and evaporated to a small volume. Benzene is then added and evaporated and the residue is cooled on ice giving crystals of 2-(4'-fluorophenyl) imidazole; M.P. 196–198° C.

6 gm. of 2-(4'-fluorophenyl) imidazole is added to 1.7 ml. of concentrated nitric acid in 75 ml. of acetic anhydride in an ice bath. The reaction mixture is warmed over steam for 30 minutes, poured over crushed ice and the resulting solid is filtered. Recrystallization from acetone-ether gives 2-(4'-fluorophenyl) - 4 - nitroimidazole; M.P. 224–225° C.

When the above process is carried out using 2-phenyl imidazole,
2-(4'-tolyl) imidazole,
2-(4'-carboxyphenyl) imidazole,
N',N'-dimethyl-2-(4'-aminophenyl) imidazole,
2-(2'nitrophenyl) imidazole,
N'N'-dimethyl-2-(3'-sulfonamidophenyl) imidazole,
2-(2'-methoxyphenyl) imidazole,
2-(4'-methylthiophenyl) imidazole,
2-(4'-cyanophenyl) imidazole,
2-(4'-carboxamidophenyl) imidazole,
N'-methyl-2-(4'-carboxamidophenyl) imidazole,
N',N'-dimethyl-2-(4'-carboxamidophenyl) imidazole,
2-(2'-formylphenyl) imidazole,
2-(4'-acetylphenyl) imidazole,
2-(4'-acetylaminomethylphenyl) imidazole,
N',N'-dimtheyl-2-(3'-aminomethylphenyl) imidazole,
2-(4'-N'-morpholinomethylphenyl) imidazole,
2-(4'-N'-piperidinomethylphenyl) imidazole,
2-(4'-N'-pyrrolidinomethylphenyl) imidazole,
2-(2'-methoxycarbonylphenyl) imidazole or 2-(4'-methylsulfonylphenyl) imidazole in place of 2-(4'-fluorophenyl) imidazole,
there is obtained 2-phenyl-4-nitroimidazole,
2-(4'-tolyl)-4-nitroimidazole,
2-(4'-carboxyphenyl)-4-nitroimidazole,
N'-N'-dimethyl-2-(4'-aminophenyl)-4-nitroimidazole,
2-(2'-nitrophenyl)-4-nitroimidazole,
N',N'-dimethyl-2-(3'-sulfonamidophenyl)-4-nitroimidazole,
2-(2'-methoxyphenyl)-4-nitroimidazole,
2-4(4'-methylthiophenyl)-4-nitroimidazole,
2-(4'-cyanophenyl)-4-nitroimidazole,
2-(4'-carboxamidophenyl)-4-nitroimidazole,
N'-methyl-2-(4'-carboxamidophenyl)-4-nitroimidazole,
N',N'-dimethyl-2-(4'-carboxamidophenyl)-4-nitroimidazole,
2-(2'-formylphenyl)-4-nitroimidazole,
2-(4'-acetylphenyl)-4-nitroimidazole,
2-(4'-acetylaminomethylphenyl)-4-nitroimidazole,
N',N'-dimethyl-2-(3'-aminomethylphenyl)-4-nitroimidazole,
2-(4'-N'-morpholinomethylphenyl)-4-nitroimidazole,
2-(4'-N'-piperidinomethylphenyl)-4-nitroimidazole,
2-(4'-N'-pyrrolidinomethylphenyl)-4-nitroimidazole,
2-(2'-methoxycarbonylphenyl)-4-nitroimidazole,
or 2-(4'-methylsulfonylphenyl)-4-nitroimidazole,
respectively.

When the above processes are carried out using acetic acid in place of acetic anhydride, the corresponding 4-nitroimidazoles are obtained.

Example 4.—1-methyl-2-(4'-fluorophenyl)-5-nitroimidazole

A sample of 4 gm. of 2-(4'-fluorophenyl)-4-nitroimidazole is dissolved in 200 ml. of warm 1,2-dimethoxy ethane, treated with charcoal, filtered and cooled in an ice bath. Excess ethereal diazomethane (130 ml.) is added in small portions and the reaction mixture is allowed to cool for two hours. The excess diazomethane is boiled off in a fume hood and the solution is then evaporated to near dryness in vacuo. The residue is recrystallized from acetone-ether to give 1-methyl-2-(4'-fluorophenyl)-5-nitroimidazole; M.P. 166–167° C.

When the above process is carried out and 2-phenyl-4-nitroimidazole,
2-(4'-tolyl)-4-nitroimidazole,
2-(4'-biphenylyl)-4-nitroimidazole,
2-(4'-chlorophenyl)-4-nitroimidazole,
N'-methyl-2-(2'-aminophenyl)-4-nitroimidazole,
N',N'-dimethyl-2-(2'-aminophenyl)-4-nitroimidazole,
2-(4'-nitrophenyl)-4-nitroimidazole,
N',N'-dimethyl-2-(3'-sulfonamidophenyl)-4-nitroimidazole,
2-(2'-methoxyphenyl)-4-nitroimidazole,
2-(4'-methylthiophenyl)-4-nitroimidazole,
2-(4'-cyanophenyl)-4-nitroimidazole,
2-(4'-carboxamidophenyl)-4- nitroimidazole,
N'-methyl-2-(4'-carboxamidophenyl)-4-nitroimidazole,
N',N'-dimethyl-2-(4'-carboxamidophenyl)-4-nitroimidazole,
2-(4'-acetylaminomethylphenyl)-4-nitroimidazole,
N'-methyl-2-(2'-aminomethylphenyl)-4-nitroimidazole,
N',N'-diethyl-2-(4'-aminomethylphenyl)-4-nitroimidazole,
2-(4'-N'-morpholinomethylphenyl)-4-nitroimidazole,
2-(4'-N'-piperidinomethylphenyl)-4-nitroimidazole,
2-(4'-N'-pyrrolidinomethylphenyl))-4-nitroimidazole, 2-(2'-hydroxyethylphenyl)-4-nitroimidazole,
2-(2'-methoxycarbonylphenyl)-4-nitroimidazole,
or 2-(4'-methylsulfonylphenyl)-4-nitroimidazole is used in place of 2-(4'-fluorophenyl)-4-nitroimidazole, there is obtained 1-methyl-2-phenyl-5-nitroimidazole,
1-methyl-2-(4'-tolyl)-5-nitroimidazole,
1-methyl-2-(4'-biphenylyl)-5-nitroimidazole,
1-methyl(-2-4'-chlorophenyl)-5-nitroimidazole,
1,N'-dimethyl-2-(2'-aminophenyl)-5-nitroimidazole,
1,N',N(-trimethyl-2-(2'-aminophenyl)-5-nitroimidazole,
1-methyl-2-(4'-nitrophenyl)-5-nitroimidazole,
1,N',N'-trimethyl-2-(3'-sulfonamidophenyl)-5-nitroimidazole,
1-methyl-2-(2'-methoxyphenyl)-5-nitroimidazole,
1-methyl-2-(4'-methylthiophenyl)-5-nitroimidazole,
1-methyl-2-(4'-cyanophenyl)-5-nitroimidazole,
1-methyl-2-(4'-carboxamidophenyl)-5-nitroimidazole,
1,N'-dimethyl-2-(4'-carboxamidophenyl)-5-nitroimidazole,
1,N',N'-trimethyl-2-(4'-carboxamidophenyl-5-nitroimidazole,
1-methyl-2-(4'-acetylaminomethylphenyl)-5-nitroimidazole,
1,N'-dimethyl-2-(2'-aminomethylphenyl)-5-nitroimidazole,
1-methyl-N',N'-diethyl-2-(4'aminomethylphenyl)-5-nitroimidazole,
1-methyl-2-(4'-N'-morpholinomethylphenyl)-5-nitroimidazole,
1-methyl-2-(4'-N'-piperidinomethylphenyl)-5-nitroimidazole,
1-methyl-2-(4'-N'-pyrrolidinomethylphenyl)-5-nitroimidazole,
1-methyl-2-(2'-hydroxythylphenyl)-5-nitroimidazole,
1-methyl-2-(2'-methoxycarbonylphenyl)-5-nitroimidazole,
or 1-methyl-2-(4'-methylsulfonylphenyl)-5-nitroimidazole, respectively.

Example 5.—2-(4'-chlorophenyl)-4-nitroimidazole

A solution of 15 ml. of p-chlorobenzaldehyde and 40 ml. of 30% aqueous glyoxal in 50 ml. of methanol is stirred during the addition of 150 ml. of concentrated ammonium hydroxide. The reaction mixture is allowed to stand at room temperature overnight. The ethanol is then evaporated in vacuo and the reaction mixture made slightly alkaline by the addition of sodium hydroxide. The reaction mixture is then extracted with ethyl acetate and the ethyl acetate extracts are evaporated in vacuo. The residue is dissolved in methanol and the solution is evaporated to give 2-(4'-chlorophenyl) imidazole which melts at 248–249° C.

A 1.78 gm. sample of 2-(4'-chlorophenyl) imidazole is added in small portions to a well-stirred solution of 0.41 ml. of 30% fuming nitric acid in 5 ml. of 30% fuming sulfuric acid. The reaction mixture is warmed over steam for 30 minutes, cooled and poured over crushed ice. The product is isolated, washed with water and recrystallized from ethyl-acetate giving 2-(4'-chlorophenyl)-4-nitroimidazole; M.P. 264–265° C.

Example 6.—1-methyl-2-(4'-chlorophenyl)-5-nitroimidazole

A mixture of 4.46 gm. of 2-(4'-chlorophenyl)-4-nitroimidazole and 2 ml. of dimethyl sulfate is heated for 35 minutes at 155–160° C. The mixture is cooled and agitated in a mixture of 500 ml. of 0.5 N sodium hydroxide and 500 ml. of chloroform. The chloroform layer is washed with water, dried over sodium sulfate and concentrated to a residue. This residue is recrystallized from ethyl acetate to give 1-methyl-2-(4'-chlorophenyl)-5-nitroimidazole; M.P. 137–138° C.

Example 7.—2-(2'-nitrophenyl)-4-nitroimidazole

To 250 ml. of ethanol and 33 ml. of 30% glyoxal is added 15.1 gm. of o-nitrobenzaldehyde. The mixture is stirred rapidly and 600 ml. of ammonium hydroxide is added with stirring. The stirring is conducted for 72 hours at room temperature and the ethanol is then evaporated in vacuo. The mixture is then extracted with two 1 l. portions of chloroform. The chloroform extracts are combined and extracted with three 250 ml. portions of 2.5 N hydrochloric acid. The acid extracts are made alkaline with 11.6 N sodium hydroxide and are then extracted with chloroform. The chloroform extract is dried, filtered and evaporated to dryness giving 2-(2'-nitrophenyl) imidazole; M.P. 191–192° C.

375 mg. of 2-(2'-nitrophenyl) imidazole is added in small portions to 0.1 ml. of nitric acid (specific gravity 1.5) in 5 ml. of 30% fuming sulfuric acid. The reaction mixture is stirred for 25 minutes in an ice bath and heated over steam for 20 minutes. After cooling the reaction mixture is poured over crushed ice and the crystalline material which forms is filtered and washed with water. Recrystallization from ethyl acetate gives 2-(2'-nitrophenyl)-4-nitroimidazole; M.P. 242-243° C.

When 2 - (4'-carboxyphenyl) imidazole, 2-(4'-aminophenyl) imidazole, N'-methyl-2-(4'-aminophenyl) imidazole, N',N'-dimethyl-2-(4'-aminophenyl) imidazole, 2-(3'-sulfonamidophenyl) imidazole, N'-methyl-2-(3'-sulfonamidophenyl) imidazole, N',N'-dimethyl-2-(4'-sulfonamidophenyl) imidazole, 2-(4'-cyanophenyl) imidazole, 2-(4'-carbohydrazidophenyl) imidazole or 2-(4'-ethoxycarbonylphenyl) imidazole is used in place of 2-(2'-nitrophenyl) imidazole in the above process, there is obtained 2-(4'-carboxyphenyl)-4-nitroimidazole, 2 - (4'-aminophenyl)-4-nitroimidazole, N'-methyl-2-(4'-aminophenyl)-4-nitroimidazole, N',N'-dimethyl-2-(4'-aminophenyl)-5-nitroimidazole, 2-(3'-sulfonamidophenyl)-4-nitroimidazole, N'-methyl-2-(3'-sulfonamidophenyl)-4 - nitroimidazole, N',N' - dimethyl-2-(4'-sulfonamidophenyl)-4-nitroimidazole, 2-(4'-cyanophenyl) - 4 - nitroimidazole, 2-(4'-carboxhydrazidophenyl)-4-nitroimidazole or 2-(4'-ethoxycarbonylphenyl)-4-nitroimidazole, respectively.

When 2-(4'-formylphenyl) imidazole, 2-(4'-acetylphenyl) imidazole or 2-(2'-methylsulfonylphenyl) imidazole is used in place of 2-(2'-nitrophenyl) imidazole in the above process, there is obtained 2-(4'-formylphenyl)-4-nitroimidazole, 2-(4'-acetylphenyl)-4-nitroimidazole or 2-(2'-methylsulfonylphenyl)-4-nitroimidazole, respectively.

Example 8.—1-methyl-2-(2'-nitrophenyl)-5-nitroimidazole

To 2.13 ml. of dimethyl sulfate is added 5.0 gm. of 2-(2'-nitrophenyl)-4-nitroimidazole. The mixture is heated for two hours at a temperature of 150° C. The reaction mixture is cooled and added to a mixture of 1.25 N sodium hydroxide and chloroform. The resulting solution is extracted with five 300 ml. portions of chloroform and the chloroform is then removed by evaporation in vacuo. The residue is recrystallized from acetone-ether and gives 1-methyl - 2 - (2'-nitrophenyl)-5-nitroimidazole; M.P. 143–145° C.

Example 9.—2-(3',5'-dinitrophenyl)-4-nitroimidazole

To 250 ml. of hot absolute ethanol is added 10 gm. of 3,5-dinitrobenzonitrile. The resulting solution is cooled in an ice bath and saturated with hydrogen chloride. The reaction mixture is maintained at 5° C. for 24 hours and is then diluted with ether until a volume of 1 l. is obtained. The reaction mixture is then filtered, and the precipitate is washed with ether and air-dried giving ethyl 3,5-dinitrophenyl carboximidate hydrochloride; M.P. 283–285° C.

12 gm. of ethyl 3,5-dinitrophenyl carboximidate hydrochloride is dissolved in 25 ml. of methanol. To this is added 5.8 gm. of amino acetaldehyde diethyl acetal in 10 ml. of methanol. The resulting mixture is allowed to stand at room temperature for two hours and is then evaporated in vacuo leaving an oily residue. The residue is treated with 20 ml. of cold concentrated sulfuric acid with stirring and the reaction mixture is poured over ice and 11.7 N sodium hydroxide. The resulting alkaline solution is extracted with chloroform and the extracts are combined and evaporated. The residue is dissolved in ethyl acetate and evaporated to a residue. Hexane is then added and on standing crystals form which when recrystallized from 1,2-dimethoxy ethane give 2-(3',5'-dinitrophenyl) imidazole; M.P. 240–242° C.

A 1 gm. sample of 2-(3',5'-dinitrophenyl) imidazole is dissolved in 10 ml. of acetic anhydride which contains 0.27 ml. of concentrated nitric acid. The reaction mixture is heated over steam until the reaction subsides. The acetic anhydride is removed by evaporation in vacuo. The remaining crystalline material is dissolved in ethyl acetate and washed with dilute sodium bicarbonate and water. The solution is then dried over magnesium sulfate, filtered, and the ethyl acetate is evaporated in vacuo. The product, 2-(3',5'-dinitrophenyl)-4-nitroimidazole is recrystallized from 1,2-dimethoxy ethane; M.P. 285–290° C.

Example 10.—1-methyl-2-(3',5'-dinitrophenyl)-5-nitroimidazole 5 gm. of 2-(3',5'-dinitrophenyl)-4-nitroimidazole is dissolved in 100 ml. of 1,2-dimethoxy ethane and cooled in an ice bath. An excess of ethereal diazomethane is added and the resulting mixture is allowed to stand at room temperature overnight. The reaction mixture is then evaporated in vacuo and the residue is dissolved in acetone. The resulting solution is treated with charcoal, evaporated and the residue is triturated with hexane. The crystalline product is recrystallized from hexane giving 1-methyl-2-(3',5'-dinitrophenyl)-5-nitroimidazole; M.P. 195–198° C.

When 2-chloro-1-diazoethane is used in place of diazomethane in the above process, there will result 1-(2'-chloroethyl)-2-(3',5'-dinitrophenyl)-5-nitroimidazole.

Example 11.—2-(3',4'-dichlorophenyl)-4-nitroimidazole 365 gm. of 3,4-dichlorobenzamide is refluxed for 48 hours with 2 l. of 50% thionyl chloride in benzene. The benzene-thionyl chloride mixture is then distilled off, additional benzene is added and the solution is evaporated. The resulting 3,4-dichlorobenzonitrile is dissolved in 1.5 l. of absolute ethanol and the solution is added to 4.5 l. of absolute ethanol saturated with hydrogen chloride. The resulting solution is maintained at about 5° C. for 9 days and is then evaporated in vacuo to a small volume. The residue is poured into ether, cooled, filtered and washed with ether giving ethyl-3,4-dichlorobenzimidate hydrochloride; M.P. 117–118° C.

The above benzimidate is dissolved in 125 ml. of methanol. 66 gm. of amino acetaldehyde diethyl acetal in 125 ml. of methanol is added with stirring in an ice bath. The reaction mixture is allowed to stand at room temperature for 24 hours and after removal of solvent is treated with concentrated sulfuric acid. The reaction mixture is poured into 11.7 N sodium hydroxide and ice. The crystals formed are dissolved in acetone and the solution is evaporated giving 2-(3',4'-dichlorophenyl) imidazole; M.P. 198–199° C.

1 gm. of 2-(3',4'-dichlorophenyl) imidazole is dissolved in 10 ml. of acetic anhydride containing 0.30 ml. concentrated nitric acid. The reaction mixture is heated over a steam cone and when the vigorous reaction is over, acetic anhydride is evporated in vacuo. The residue is dissolved in ethyl acetate, washed with dilute sodium bicarbonate and water, and the solution is dried over magnesium sulfate. The solution is then filtered and the ethyl acetate is evaporated in vacuo. The remaining material is recrystallized from 1,2-dimethoxy ethane and 2-(3',4'-dichlorophenyl)-4-nitroimidazole, M.P. 221–223° C., results.

When the above process is carried out using 2-(4'-morpholinophenyl) imidazole, 2-(4'-pyrrolidinophenyl) imidazole, 2-(4'-piperidinophenyl) imidazole or 2-(3'-aminoethylphenyl) imidazole in place of 2-(3',4'-dichlorophenyl) imidazole, there is obtained 2-(4'-morpholino)-4-nitroimidazole, 2-(4'-pyrrolidinophenyl)-4-nitroimidazole, 2-(4'-piperidinophenyl)-4-nitroimidazole or 2-(3'-acetylaminomethylphenyl)-4-nitroimidazole, respectively.

When acetic acid is used in place of acetic anhydride in the above nitration process, 2-(3',4'-dichlorophenyl)-4-nitroimidazole again results.

Example 12.—1-methyl-2-(3',4'-dichlorophenyl)-5-nitroimidazole 2 gm. of 2-(3',4'-dichloro)-4-nitroimidazole is dissolved in 20 ml. of 1,2-dimethoxy ethane and treated with an excess of diazomethane in ether. The reaction mixture is then heated on the steam cone and evaporated to a small volume. The residue is then dissolved in ether, passed through an alumina filtration column and evaporated to dryness in vacuo. Recrystallization from benzene gives the product, 1-methyl-2-(3',4'-dichlorophenyl) 5-nitroimidazole; M.P. 147–148° C.

When 2-(4'-morpholinophenyl)-4-nitroimidazole, 2-(4'-pyrrolidinophenyl)-4-nitroimidazole, 2-(4'-piperadinophenyl)-4-nitroimidazole or 2-(3'-acetylaminomethylphenyl)-4-nitroimidazole is used in the above process in place of 2-(3',4'-dichlorophenyl)-4-nitroimidazole, there is obtained 1-methyl-2-(4'-morpholinophenyl)-5-nitroimidazole, 1-methyl-2-(4'-pyrrolidinophenyl)-5-nitroimidazole, 1-methyl-2-(4'-piperadinophenyl)-5-nitroimidazole or 1-methyl-2-(3'-acetylaminomethylphenyl)-5-nitroimidazole, respectively.

Example 13.—2-(2'-fluorophenyl)-4-nitroimidazole 53.1 gm. of 2-fluorobenzonitrile is cooled to 5° C. and added to an ice-cold solution of 76.8 gm. of dry hydrogen chloride in absolute ethanol. The mixture is stored in a refrigerator for three days and then concentrated to small volume in vacuo at 40–50° C. Trituration of the residue with ether gives ethyl-2-fluorobenzimidate hydrochloride; M.P. 110–111° C.

32.3 gm. of the imino ether is dissolved in 150 cc. dry methanol containing 21.1 gm. (0.158 mol) of amino acetaldehyde diethyl acetal. After 24 hours at room temperature, the reaction mixture is concentrated to an oily residue which is cooled and added dropwise with stirring to 35 cc. of cold, concentrated sulfuric acid. The resulting mixture is poured over ice, made alkaline with 47% aqueous sodium hydroxide solution, and then extracted with ethyl acetate. The ethyl acetate extracts are washed with water and concentrated to an oily residue which affords crystals upon trituration with a mixture of ethyl acetate and ether. Recrystallization from acetone gives 2-(2'-fluorophenyl) imidazole; M.P. 196–198° C.

2-(2'-fluorophenyl) imidazole (7.17 gm.) is added to a solution of 3.5 cc. of concentrated nitric acid in 35 cc. of acetic anhydride. The mixture is warmed on the steam bath for 5 minutes, cooled and treated with 200 ml. of water. After decomposition of the acetic anhydride is complete, the crystalline product is collected by filtration and washed with water giving 2-(2'-fluorophenyl)-4-nitroimidazole; M.P. 222–225° C.

Example 14.—1-methyl-2-(2'-fluorophenyl)-5-nitroimidazole

A mixture of 2-(2'-fluorophenyl)-4-nitroimidazole (1.00 gm.) and dimethyl sulfate (0.4 cc.) is heated for thirty minutes at 113° C. The mixture is cooled and agitated with 0.5 N sodium hydroxide and chloroform. The chloroform extracts are washed with water and dried over sodium sulfate and concentrated to a residue which is recrystallized from ethyl acetate giving 1-methyl-2-(2'-fluorophenyl)-5-nitroimidazole; M.P. 163–165° C.

Example 15.—2-(2'-naphthyl)-4-nitroimidazole

A solution of 46.4 gm. β-naphthonitrile (.303 mol) in 80 ml. of absolute alcohol is saturated with dry hydrogen chloride and the solution is left at 5° C. for 22 hours. After slow dilution with 500 ml. of ether the crystalline precipitate, ethyl-2-naphthimidate hydrochloride, is filtered off, washed with ether and air dried.

53.7 gm. (.228 mol) ethyl-2-naphthimidate hydrochloride is treated overnight with 30.3 gm. (.228 mol) of aminoacetal in 200 ml. methanol. The methanol is evaporated in vacuo and the syrupy residue is treated with 80 ml. concentrated sulfuric acid while cooled on ice. The dark acid solution is poured with stirring into a slight excess of dilute ice-cooled sodium hydroxide. The dark oil which separates is isolated by decantation and extracted three times with boiling ethyl acetate and then with boiling acetone. Evaporation of the combined extracts in vacuo leaves 24 gm. of a viscous syrup. The syrup is dissolved in 300 ml. acetone, the solution is diluted with 600 ml. ether and the resulting solution filtered through 300 gm. of basic aluminum oxide prepared in acetone-ether solvent. The aluminum oxide is washed with a further 1.5 l. of solvent and the eluate is evaporated in vacuo to give a mixture of oil and crystals. Ether washing and filtering gives pale yellow crystals of 2-(2'-naphthyl) imidazole which melt at 205–208° C. A further crop is obtained by re-extracting the original crude dark oil with ethyl acetate and treating the extracts as above.

1.00 gm. of 2-(2'-naphthyl) imidazole (5.15 mmol) is added to a solution of .38 ml. concentrated nitric acid in 3.5 ml. acetic anhydride (prepared with ice cooling). The crystalline nitrate salt precipitates out almost immediately. The mixture is heated on the steam bath for about 5 minutes and is then cooled and treated with 40 ml. 2.5 N sodium hydroxide with further cooling. The solution is extracted with ethyl acetate and this extract is back-extracted 7 times with dilute sodium hydroxide solution. The combined basic extracts are made slightly acidic with dilute hydrochloric acid and are cooled in ice giving crystalline 2-(2'-naphthyl)-4-nitroimidazole.

When the 2-(2'-naphthyl) imidazole is replaced by N'-methyl-2-(4'-aminophenyl) imidazole or N',N'-dimethyl-2-(4'-aminophenyl) imidazole in the above process, there is obtained N'-methyl-2-(4'-aminophenyl)-4-nitroimidazole or N',N'-dimethyl-2-(4'-aminophenyl) imidazole, respectively. These compounds are converted to their corresponding 1-methyl-5-nitroimidazole derivatives when the process of the following example is utilized and the aminophenyl nitroimidazoles are used in place of 2-(2'-naphthyl)-4-nitroimidazole.

Example 16.—1-methyl-2-(2'-naphthyl)-5-nitroimidazole

A solution of 349 gm. (1.36 mmol) of 2-(2'-naphthyl)-4-nitroimidazole hydrate in 10 ml. ethylene glycol dimethyl ether is treated with a 250% excess of diazomethane in 10 ml. of ether with cooling in ice. The solvents are evaporated at atmosphere pressure and in vacuo. The brown crystalline residue is extracted three times with boiling ether and the cooled combined extracts are filtered through 5.0 gm. of basic aluminum oxide. After washing the aluminum oxide with further ether, the eluate is evaporated in vacuo to leave a pale yellow crystalline residue of 1-methyl-2-(2'-naphthyl)-5-nitroimidazole. This is recrystallized from methanol to give a product melting at 158–160° C.

When the above process is carried out using 2-(3'-fluoro-2'-naphthyl)-4-nitroimidazole in place of 2-(2'-naphthyl)-4-nitroimidazole, there is obtained 1-methyl-2-(3'-fluoro-2'-naphthyl)-4-nitroimidazole.

Similarly, when 2-(3'-nitro-2'-naphthyl)-4-nitroimidazole, 2-(4'-fluoro-2'-naphthyl)-4-nitroimidazole or 2-(2'-carboxamido-3'-naphthyl)-4-nitroimidazole is used in place of 2-(2'-naphthyl)-4-nitroimidazole, there is obtained 1-methyl-2-(3'-nitro-2-naphthyl)-5-nitroimidazole, 1-methyl-2-(4'-fluoro-2-naphthyl)-5-nitroimidazole or 1-methyl - 2 - (2' - carboxamido - 3' - naphthyl) - 5 - nitroimidazole, respectively.

Example 17.—2-(4'-acetylaminophenyl)-4-nitroimidazole

Into a solution of 62 gm. of 2-(4'-nitrophenyl)-4-nitroimidazole in a mixture of 420 ml. ethanol and 210 ml. of concentrated ammonia is bubbled a stream of hydrogen sulfide for ½ hour. The solution is refluxed ½ hour, treated with 27 ml. concentrated ammonia, and hydrogen sulfide is again bubbled through for ½ hour. After a second ½ hour reflux the ammonia-hydrogen sulfide addition and reflux procedure is repeated. Ethanol is removed in vacuo, water is added, and the mixture is acidified with hydrochloric acid. The insoluble sulfur is filtered off and the filtrate is extracted with ethyl acetate. After neutralization with sodium hydroxide, the aqueous phase is filtered to give crude, dark 2-(4'-aminophenyl)-4-nitroimidazole.

32.3 gm. of the crude reduction product is heated 1¾ hours of the steam bath with a large excess of acetic anhydride. The mixture is cooled and the dark precipitate of 2-(4'-acetylaminophenyl)-4-nitroimidazole is filtered off and washed with acetone.

Example 18.—1-methyl-2-(4'-aminophenyl)-5-nitroimidazole 37.3 gm. of 2 - (4' - acetylaminophenyl) - 4 - nitroimidazole is heated for 15 minutes with 18.1 ml. methyl sulfate. After cooling, the reaction mixture is treated with concentrated ammonia solution and the insoluble material is filtered off. The precipitate is then extracted with methanol. The methanol solution is evaporated to dryness and the residue extracted with acetone. The acetone solution is filtered through a 600 gm. column of alumina using additional acetone to wash the column. Evaporation of the eluate to dryness leaves a residue of 1 - methyl - 2 - (4' - acetylaminophenyl) - 5 - nitroimidazole; M.P. 246–247° C.

8.3 gm. of 1 - methyl - 2 - (4' - acetylaminophenyl)-5 - nitroimidazole is hydrolyzed at 100° C. with 6 N hydrochloric acid. The cooled hydrolyzate is neutralized with sodium hydroxide and the resulting precipitate is recrystallized from acetone to give 1 - methyl - 2 - (4'-aminophenyl) - 5 - nitroimidazole melting at 205–215° C. Final purification is effected by alumina chromatography using benzene to introduce the material in the column and ether-chloroform (1:1) to elute the product. The analytical sample melts at 222–223° C.

Example 19.—2-(2'-aminophenyl)-4-nitroimidazole

A 50 mg. sample of 2 - (2' - acetylaminophenyl) - 4-nitroimidazole is heated on the steam cone in 2 ml. of 5 N hydrochloric acid for two hours. After a period of time, precipitate begins to form. Upon cooling additional precipitate forms and centrifugation and decantation give 2 - (2' - aminophenyl) - 4 - nitroimidazole; M.P. 230–233° C.

Example 20.—N',N'-dimethyl-2-(4'-sulfonamidophenyl)-4-nitro imidazole 15 gm. of 2 - phenyl imidazole is treated with 50 ml. of chlorosulfonic acid on a steam cone overnight. The excess chlorosulfonic acid is evaporated in vacuo. The residue is then cooled and added dropwise to a cooled solution of aqueous dimethylamine with stirring. The solid product, N',N' - dimethyl - 2 - (4' - sulfonamidophenyl) imidazole, is filtered off, washed with water and recrystallized from chloroform-petroleum ether; M.P. 180–185° C. Recrystallization from chloroform-petroleum ether gives a product with a melting point of 187–188° C.

7.2 gm. of the imidazole product is dissolved in 50 ml. of acetic anhydride containing 1.5 ml. of concentrated nitric acid. The reaction mixture is warmed on the steam cone and evaporated in vacuo to remove the acetic anhydride. The resulting mixture is made alkaline, treated with charcoal, recrystallized and filtered. Recrystallization from 1,2 - dimethoxy ethane gives N',N' - dimethyl - 2 - (4' - sulfonamidophenyl) - 4 - nitroimidazole; M.P. 236–238° C.

When acetic acid is used in place of acetic anhydride in the above nitration process, N',N' - dimethyl - 2 - (4'-sulfonamidophenyl) - 4 - nitroimidazole again results.

Example 21.—1,N',N'-trimethyl-2-(4'-sulfonamidophenyl)-5-nitroimidazole 3 gm. of N',N' - dimethyl - 2 - (4' - sulfonamidophenyl) - 4 - nitroimidazole is treated in 1,2 - dimethoxy ethane with small portions of ethereal diazomethane and the reaction mixture is evaporated to dryness. The residue is dissolved in 1,2 - dimethoxy ethane and the solution is again evaporated to dryness. Recrystallization from 1,2 - dimethoxy ethane gives 1,N',N' - dimethyl - 2- (4' - sulfonamidophenyl) - 5 - nitroimidazole; M.P. 203–205° C.

Example 22.—2-(4'-carboxamidophenyl)-4-nitroimidazole 25 gm. of p - cyanobenzoic acid is refluxed with 100 ml. of thionyl chloride and 100 ml. of phenol for three hours. The solvents are removed in vacuo and the resulting acid chloride is added to aqueous ammonium hydroxide with stirring. The product, p - cyanobenzamide, has a melting point of 223–224° C.

The p - cyanobenzamide is dissolved in 2950 ml. of ethanol and this solution is saturated with hydrogen chloride. The reaction mixture is allowed to stand at room temperature for five days and ethyl p - carboxamido benzimidate hydrochloride is recovered.

The imino ether formed above is suspended in 500 ml. of methyl alcohol and added to 6.5 gm. of amino acetaldehyde diethyl acetal in 50 ml. of methanol. The reaction mixture is allowed to stand at room temperature for 24 hours and is then evaporated to a small volume, diluted with ether and cooled. The resulting solids are filtered off, washed with ether and added in small portions to 10.6 ml. of cold concentrated sulfuric acid with stirring. This reaction mixture is poured over ice in dilute sodium hydroxide and filtered giving 2 - (4' - carboxamidophenyl) imidazole; M.P. 310–315° C.

To 25 ml. of ice cold 30% fuming sulfuric acid is added with stirring 2.6 gm. of 2 - (4' - carboxamidophenyl) imidazole. Fuming nitric acid is added and the reaction mixture is heated on a steam cone for 10 minutes, poured over ice, filtered and washed with water and acetone successively giving 2 - (4' - carboxamidophenyl) - 4 - nitroimidazole; M.P. 323–326° C.

When N',N' - dimethyl - 2 - (4' - carboxamidophenyl) imidazole or N' - methyl - 2 - (4' - carboxamidophenyl) imidazole is used in the above process in place of 2 - (4'-carboxamidophenyl) imidazole, there is obtained N',N'-dimethyl - 2 - (4' - carboxamidophenyl) - 4 - nitroimidazole or N' - methyl - 2 - (4' - carboxamidophenyl)-4 - nitroimidazole, respectively.

Example 23.—1-methyl-2-(4'-carboxamidophenyl)-5-nitroimidazole 500 mg. of 2 - (4' - carboxamidophenyl) - 4 - nitroimidazole is dissolved in 200 ml. of hot 1,2 - dimethoxy ethane. The resulting mixture is filtered, cooled in an ice bath and treated with 36 ml. of an excess of ethereal diazomethane. The resulting mixture is allowed to stand for two hours in the ice bath and is then evaporated to a small volume. The mixture is then filtered and the solid product, 1 - methyl - 2 - (4' - carboxamidophenyl)-5 - nitroimidazole, is washed with ether and recrystallized from acetone-ether; M.P. 233–235° C.

When the above process is carried out using N'-methyl-2-(4'-carboxamidophenyl) - 4 - nitroimidazole or N',N'-dimethyl - 2-(4'-carboxamidophenyl) imidazole, there is obtained 1,N'-dimethyl - 2 - (4'-carboxamidophenyl)-5-nitroimidazole or 1,N',N'-trimethyl - 2 - (4'-carboxamidophenyl)-5-nitroimidazole.

Example 24.—1-methyl-2-(4'-cyanophenyl)-5-nitroimidazole 232 mg. of 2-(4'-carboxamidophenyl)-4-nitroimidazole is dehydrated in vacuo at 251–258° C. for about 6 hours. The sublimate received as a result upon recrystalization from acetone-ether is 2-(4'-cyanophenyl)-4-nitroimidazole, which upon recrystallization from acetone-ether has a melting point of 324–329° C. Additional recrystallization from ethanol gives a product melting at 333–334° C.

The above nitroimidazole is converted to 1-methyl-2-(4'-cyanophenyl)-5-nitroimidazole when the procedure of Example 23 is followed using 2-(4'-cyanophenyl)-4-nitroimidazole in place of 2-(4'-carboxamidophenyl)-4-nitroimidazole.

When the process of the first paragraph of Example 9 is carried out using 1-methyl-2-(4'-cyanophenyl)-5-nitroimidazole in place of 3,5-dinitrobenzonitrile, there is obtained the hydrochloride salt of 1-methyl-2-(4'-ethoxyiminocarboxyphenyl)-5-nitroimidazole.

Example 25.—1-methyl-2-(2',4'-dinitrophenyl)-5-nitroimidazole 2,4-dinitrobenzaldehyde (30.8 gm.) is dissolved in 300 cc. of absolute ethanol. Upon addition of 75 cc. of 30% glyoxal solution and 75 cc. of concentrated ammonium hydroxide solution, the temperature slowly rises to 64° C. After 4 hours the reaction mixture is diluted with chloroform. The organic layer is separated, washed with water, dried over magnesium sulfate and concentrated to a dark oily residue. The residue is then extracted with boiling benzene. The benzene extracts are then passed over a column of 120 gm. of alumina. Elution is continued until by-product is passed through the column. The desired product, 2-(2',4' - dinitrophenyl) imidazole is obtained by eluting the alumina column further with acetone. After recrystallization from acetone-petroleum ether, the product displays a melting point of 237–239° C.

2.16 gm. of 2-(2'-4'-dinitrophenyl) imidazole is dissolved in a mixture of 3 cc. of concentrated nitric acid and 3 cc. fuming sulfuric acid with cooling. The mixture is heated on the steam bath for 30 minutes, cooled and diluted with water. The resulting aqueous solution is extracted with ethyl acetate and the extracts are washed with water and concentrated to a residue. The residue is recrystallized from ethyl acetate to give 2-(2',4'-dinitrophenyl)-4-nitroimidazole; M.P. 215–223° C.

When the process of Example 10 is employed using 2-(2',4'-dinitrophenyl) - 4 - nitroimidazole in place of 2-(3',5'-dinitrophenyl) - 4 - nitroimidazole, the former is converted to 1-methyl-2-(2',4'-dinitrophenyl) - 5 - nitroimidazole.

Example 26.—2-(3'-nitro-4'-chlorophenyl)-4-nitroimidazole 17.8 gm. of 2-(4'-chlorophenyl) imidazole is dissolved in 12.6 gm. (2 equivalents) of fuming nitric acid in an ice bath. A salt crystallizes and the solution is allowed to remain in the ice bath until it becomes colorless. Fuming sulfuric acid is then added dropwise with stirring to the reaction mixture which mixture is then heated on the steam bath for two hours. The reaction products are then poured over ice with stirring and a crystalline yellow material, 2-(3'-nitro-4'-chlorophenyl) - 4 - nitroimidazole, is filtered off; M.P. 213–214° C.

Example 27.—1-methyl-2-(3'-nitro-4'-chlorophenyl)-5-nitroimidazole 5.4 gm. of 2-(3'-nitro-4'-chlorophenyl)-4-nitroimidazole is heated at 140–144° C. for two hours in the presence of 2 ml. of dimethyl sulfate. The reaction mixture is made alkaline with dilute sodium hydroxide and is then extracted with three 600 ml. portions of chloroform and the combined chloroform extracts are backwashed with two 100 ml. portions of 0.1 N sodium hydroxide and two 150 ml. portions of water. The chloroform solution is dried over sodium sulfate and is filtered and the filtrate is evaporated to dryness giving 1-methyl-2-(3'-nitro-4'-chlorophenyl)-5-nitroimidazole; M.P. 104–107° C.

When the above process is carried out using 2-(4'-trifluoromethylphenyl) - 4 - nitroimidazole in place of 2-(3'-nitro-4'-chlorophenyl)-4-nitroimidazole, there is obtained 1-methyl-2-(4'-trifluoromethylphenyl)-5-nitroimidazole.

Example 28.—2-(4'-biphenylyl)-4-nitroimidazole

To a solution of .07 ml. (1.1 mmol) of concentrated nitric acid in 2.0 ml. of acetic anhydride is added 220 mg. (1.00 mmol) of 2-(4'-biphenylyl) imidazole. After brief stirring to insure solution, the mixture is heated on the steam bath for 10 minutes. The resulting red solution is cooled and poured into excess aqueous sodium bicarbonate solution and allowed to stand for a day. The crude product is filtered off, dried and purified by filtration through 2.0 gm. of acid-washed aluminum oxide in 1:1 acetone-ether solvent. The partially crystalline residue obtained upon evaporation of the eluate is recrystallized from methanol to give pale yellow crystals melting at 242–245° C. Two further recrystallizations from methanol give 2-(4'-biphenylyl)-4-nitroimidazole; M.P. 246.5–247.5° C.

Example 29.—1-methyl-2-(4'-biphenylyl)-5-nitroimidazole

A mixture of .41 gm. (1.55 mmol) of 2-(4'-biphenylyl)-4-nitroimidazole and .15 ml. (196 mg., 1.55 mmol) of methyl sulfate is heated 5 minutes at 150–160° C. The resulting viscous oil is cooled and extracted with a mixture of chloroform and excess dilute sodium hydroxide solution. The reaction product dissolves leaving an orange suspension of orange sodium salt of unreacted starting material in the aqueous phase. The aqueous phase is re-extracted with chloroform and the combined organic phases are dried and evaporated in vacuo to give a crystalline solid. This is filtered through 3.0 gm. of alkaline aluminum oxide in 1:2 dichloromethane ether solvent to give a pale yellow purified product. Recrystallization from alcohol gives a product melting at 206–211° C. Sublimation at 190–200° C. and 1 mm. pressure gives 1-methyl-2-(4' - biphenylyl) - 5 - nitroimidazole melting at 208–210° C.

When in the above process in place of methyl sulfate there is used methyl toluene sulfonate or β-chloro-ethyl toluene sulfonate, there will result 1-methyl-2-(4'-biphenylyl)-5-nitroimidazole or 1 - β - chloroethyl-2-(4'-biphenylyl)-5-nitroimidazole, respectively.

Example 30.—2-(3'-nitro-4'-methylphenyl)-4-nitroimidazole

To a mixture of 1.00 gm. (6.3 mmol) of 2-(p-tolyl)-imidazole and .64 ml. of fuming nitric acid (13.8 mmol) is added with stirring and ice cooling 3.2 ml. of 30% fuming sulfuric acid. The mixture is heated one hour on the steam bath, cooled and poured into ice water. The solid product is filtered off, washed with water and dissolved in 20 ml. water containing an excess of sodium hydroxide. The solution is cooled and the red-orange crystals of the sodium salt of 2-(3'-nitro-4'-methylphenyl)-4-nitroimidazole are filtered off. Acidification of a warm aqueous solution of this salt gives a yellow precipitate which is recrystallized from methanol. The resulting crystalline 2-(3'-nitro - 4' - methylphenyl)-4-nitroimidazole melts at 207–209° C.

Example 31.—1-methyl-2-(3'-nitro-4'-methylphenyl)-5-nitroimidazole 1.15 gm. of 2-(3'-nitro-4'-methylphenyl)-4-nitroimidazole is heated for 35 minutes at 140° C. with 498 mg. of methyl sulfate. After cooling the mixture is dissolved by shaking with mixed chloroform and excess dilute sodium hydroxide. The chloroform phase is then evaporated to dryness. The crude crystalline residue is filtered through a 5.0 gm. column of basic alumina using 3:7 (v./v.) methylene chloride-ether as eluent. The residue from evaporation of the eluate is recrystallized from benzene-hexane to give 1 - methyl - 2 - (3' - nitro-4'-methylphenyl)-5-nitroimidazole melting at 95–97° C.

When 2-(4'-formylphenyl)-4-nitroimidazole, 2-(4'-acetylphenyl)-4-nitroimidazole or 2-(2'-methylsulfonylphenyl)-4-nitroimidazole is used in place of 2-(3'-nitro-4'-methylphenyl)-4-nitroimidazole in the above process, there is obtained 1-methyl-2-(4'-formylphenyl)-5-nitroimidazole, 1-methyl-2-(4'-acetylphenyl)-5-nitroimidazole or 1-methyl-2-(2' - methylsulfonylphenyl) - 5 - nitroimidazole, respectively.

Example 32.—1-methyl-2-(4'-hydroxyphenyl)-5-nitroimidazole 5.00 gm. of 1-methyl-2-(4'-aminophenyl)-5-nitroimidazole in 50 ml. 10% sulfuric acid is treated with 1.725 gm. sodium nitrite in a minimal volume of water while cooled in an ice bath. The solution is then warmed on the steam bath for an hour, cooled and carefully neutralized with 2.5 N sodium hydroxide. The resulting precipitate, 1-methyl-2-(4'-hydroxyphenyl) - 5 - nitroimidazole, is filtered off, washed with water and air dried; M.P. 221–224° C.

Example 33.—1-methyl-2-(4'-methoxyphenyl)-5-nitroimidazole 507 mg. of 1-methyl-2-(4'-hydroxyphenyl)-5-nitroimidazole in 50 ml. of methanol is treated with a large excess of ethereal diazomethane while maintained at about 0° C. After standing in the cold overnight a few drops of acetic acid are added to destroy excess diazomethane. The solvents are removed in vacuo. Water is added to the residue and sufficient .1 N sodium hydroxide is added to make the mixture basic. The insoluble precipitate of 1-methyl-2-(4' - methoxyphenyl) - 5 - nitroimidazole is filtered off, washed with water and air dried. It displays a melting point of 109–110° C. after being filtered through acid-washed alumina using 1:1 ether-petroleum ether as eluent and recrystallized from ether.

When the above process is carried out using 1-methyl-2-(4'-mercaptophenyl)-5-nitroimidazole in place of 1-methyl-2-(4'-hydroxyphenyl) - 5 - nitroimidazole, there is obtained 1-methyl-2-(4'-methylthiophenyl)-5 - nitroimidazole.

Example 34.—2-(2'-acetylaminophenyl)-4-nitroimidazole 200 mg. of 2-(2'-nitrophenyl)-4-nitroimidazole is dissolved in 1 ml. of ammonium hydroxide and 2 ml. of ethanol. Hydrogen sulfide is bubbled into the solution with stirring for about three hours. Every hour 1 ml. of ammonium hydroxide is added. After three hours, the solution is warmed to 85° C. on the steam cone and is then evaporated in vacuo to dryness. The contents of the flask are washed with a stream of nitrogen. There is then added 20 ml. of a mixture of acetic anhydride acetic acid and the mixture is heated on the steam cone for 45 minutes. After heating, the reaction mixture is cooled and the resulting solids are filtered. The filtrate is evaporated to dryness in vacuo on a steam bath. The remaining salts are dissolved in sodium hydroxide and the resulting mixture is filtered. The basic solution is extracted with three 100 ml. portions of chloroform. The aqueous alkaline solution is then acidified with glacial acetic acid and extracted with five 100 ml. portions of ethyl acetate. The ethyl acetate extracts are backwashed three times with water and evaporated to dryness in vacuo. The product is crude 2-(2'-acetylaminophenyl)-4-nitroimidazole. Recrystallization from acetone ether affords pure product; M.P. 284–285° C.

Example 35.—1-methyl-2-(2'-acetylaminophenyl)-5-nitroimidazole 2 gm. of 2-(2'-acetylaminophenyl)-4-nitroimidazole is treated with .81 ml. of dimethyl sulfate at 150° C. After cooling, dilute aqueous sodium hydroxide and chloroform are added to the reaction mixture. The chloroform phase is then evaporated to dryness giving 1-methyl-2-(2'-acetylaminophenyl)-5-nitroimidazole; melting point after recrystallization from acetone-ether, 233–235° C.

Example 36.—1-methyl-2-(4'-fluorophenyl)-4-nitroimidazole 1.2 gm. of 2-(4'-fluorophenyl)-4-nitroimidazole is dissolved in 50 ml. of dry 1,2-dimethoxy ethane. 0.180 gm. of 52% sodium hydride is washed with ether to remove the mineral oil and then is added in small portions to the solution. 0.630 ml. (30% excess) of dimethylsulfate is introduced and the solution is refluxed for 3 hours. The solution is then cooled and evaporated in vacuo to about 10 ml. The residue is diluted with 50 ml. cold water and the resulting suspension is extracted with three 150 ml. portions of chloroform. The chloroform extracts are washed with a small amount of water and dried over sodium sulfate. After filtering off the drying agent, the chloroform is evaporated in vacuo and the crystalline residue is recrystallized from chloroform. A second recrystallization from chloroform affords 1-methyl-2-(4'-fluorophenyl)-4-nitroimidazole; M.P. 187–188° C.

When the above process is used and 2-phenyl-4-nitroimidazole,
2-(4'-nitrophenyl)-4-nitroimidazole,
2-(2'-nitrophenyl)-4-nitroimidazole,
2-(2'-chlorophenyl)-4-nitroimidazole,
2-(3'-nitrophenyl)-4-nitroimidazole,
2-(4'-carboxamidophenyl)-4-nitroimidazole or
N',N'-dimethyl-2-(3'-sulfonamidophenyl)-4-nitroimidazole is used in place of 2-(4'-fluorophenyl)-4-nitroimidazole, there will result 1-methyl-2-phenyl-4-nitroimidazole,
1-methyl-2-(4'-nitrophenyl)-4-nitroimidazole,
1-methyl-2-(2'-nitrophenyl)-4-nitroimidazole,
1-methyl-2-(2'-chlorophenyl)-4-nitroimidazole,
1-methyl-2-(3'-nitrophenyl)-4-nitroimidazole,
1-methyl-2-(4'-carboxamidophenyl)-4-nitroimidazole or
1,N',N'-trimethyl-2-(3'-sulfonamidophenyl)-4-nitroimidazole, respectively.

Example 37.—1-methyl-2-(3'-nitrophenyl)-5-nitroimidazole

A 3.0 gm. (14.08 mmol) sample of 1-methyl-2-phenyl-5-nitroimidazole is added in one portion to a cold solution composed of 10 ml. concentrated sulfuric acid and 0.66 ml. of concentrated nitric acid. The reaction mixture is warmed on the steam cone for about 30 minutes. After the reaction is complete the reaction mixture is cooled in an ice bath and poured over 250 ml. cracked ice. The resulting acidic solution is then made alkaline with 11.6 N NaOH. The product, 1-methyl-2-(3'-nitrophenyl)-5-nitroimidazole, is filtered off and washed with water. Recrystallization from ether-acetone yields 1-methyl-2-(3'-nitrophenyl)-5-nitroimidazole; M.P. 125–126° C.

Example 38.—1-methyl-2-(3'-sulfonamidophenyl)-5-nitroimidazole

A 3.0 gm. (10.6 mmol) sample of 1-methyl-2-phenyl-5-nitroimidazole is added in small portions to 25 ml. of chlorosulfonic acid. The reaction mixture is then heated on the steam cone for 70 hours.

The excess chlorosulfonic acid is removed by distillation at reduced pressure. The remaining oil, contaminated with chlorosulfonic acid, is added dropwise with stirring to a slurry of ammonium hydroxide and ice. The resulting solution is extracted with ethyl acetate. The ethyl acetate extracts are dried and evaporated to dryness. The crystalline material is recrystallized from acetone ether to give 1 - methyl-2-(3'-sulfonamidophenyl)-5-nitroimidazole; M.P. 205–206° C.

Example 39.—1-methyl-2-(4'-nitrophenyl)-5-nitroimidazole

To a solution of 115 cc. of fuming nitric acid and 720 cc. of fuming sulfuric acid is added 150 gm. of 2-phenyl imidazole. The reaction mixture is cooled, stirred and then heated on the steam bath for ½ hour and poured over ice. The solid product, 2-(4'-nitrophenyl)-4-nitroimidazole, is filtered off, washed with ethyl acetate and recrystallized from dimethylformamide; M.P. 290–291° C.

56 gm. of 2-(4'-nitrophenyl)-5-nitroimidazole is heated to 120–130° C. for one hour with 33.6 cc. of dimethyl sulfate. The resulting dark, glassy material is agitated while hot with a water-ammonium hydroxide mixture and is then cooled and extracted with chloroform to obtain a dark, semi-solid product. After recrystallization from acetone-water, 1 - methyl-2-(4'-nitrophenyl)-5-nitroimidazole melting at 135–136° C. is obtained.

Example 40.—3-nitroimidazo-[2,1:a]-isoindole

A mixture of 70 gm. phthalonitrile, 100 ml. absolute ethanol and 200 ml. chloroform is saturated with dry hydrogen chloride while being stirred in an ice bath. The mixture is kept 14 days at 0° C. and is then filtered and the product, ethyl o-cyanobenzimidate hydrochloride is washed with chloroform. The mother liquors are diluted with ether until precipitation takes place and the precipitate is filtered off and added to the first crop.

136 gm. of crude ethyl o-cyanobenzimidate hydrochloride and 95 ml. amino acetaldehyde diethyl acetal is dissolved in 1 l. of methanol and the solution is allowed to stand at room temperature for one hour. The solvent is removed in vacuo and the syrupy residue is heated 1½ hours on the steam bath with 400 ml. concentrated sulfuric acid. The mixture is cooled, diluted with 2.5 l. water and extracted with chloroform. The acidic solution is made strongly basic by addition of a 5% excess of 34% sodium hydroxide. The solution is then extracted with chloroform. The chloroform extracts are discarded and the basic solution is brought to pH 5 with concentrated hydrochloric acid and evaporated to dryness in vacuo. The residual brown salts are heated at 210–220° C. for 3–4 hours at 1 mm. pressure in a sublimation apparatus. The resulting sublimate is dissolved in 200 ml. of warm 1.25 N hydrochloric acid. The solution is then cooled and the insoluble precipitate is filtered off. The filtrate is evaporated to dryness and the resulting salts are dissolved in 400 ml. of warm absolute ethanol. After cooling, a precipitate of ammonium chloride is filtered off and the filtrate boiled down to 150–200 ml. On cooling, a further crop of ammonium chloride is removed by filtration. A major portion of the ethanol is evaporated and the syrupy residue is diluted with 200 ml. of acetone to cause precipitation of 2-(2'-carboxyphenyl) imidazole hydrochloride.

1.00 gm. of this product is dissolved in 3.0 ml. of 30% fuming sulfuric acid and .50 ml. fuming nitric acid (10.8 mmol) is added over about one minute below the surface of the solution. The mixture is heated on the steam bath for about 15 minutes and then cooled, diluted with 30 ml. water and treated with 10 ml. 11.7 N sodium hydroxide solution with further cooling at 0° C. The product is filtered off and recrystallized from acetone-water to give 2-(2'-carboxyphenyl)-4-nitroimidazole.

Into a suspension of .500 gm. of (2.13 mmole) of 2-(2'-carboxyphenyl)-4-nitroimidazole in 5.0 ml. di(β-methoxyethyl) ether is passed a slow stream of diborane until all of the starting material dissolves. The mixture is allowed to stand at room temperature for one hour and the nearly solid mixture resulting is then diluted carefully with 20 ml. of water. The mixture is then cooled on ice and the precipitate, 2 - (2'-hydroxymethylphenyl)-4-nitroimidazole, is filtered off and washed with water.

303 mg. (1.38 mmol) of 2-(2'-hydroxymethylphenyl)-4-nitroimidazole is treated with 1 ml. of thionyl chloride. The excess of thionyl chloride is removed in vacuo and the residue is disolved in 1 ml. of methanol. The solution is then diluted with 5 ml. water and the precipitated oil is extracted with two portions of chloroform. After drying over sodium sulfate and evaporation in vacuo a readily crystalline brown residue of 2-(2'-chloromethylphenyl)-4-nitroimidazole is obtained. This is purified by filtering over 4.0 gm. acid-washed alumina in ethyl acetate solvent.

1.21 gm. (5.10 mmol) of the above obtained nitroimidazole is heated for 2–3 minutes at 152° C. The dark residue is then dissolved in a mixture of chloroform and excess dilute sodium hydroxide solution. The chloroform phase is combined with two further chloroform extracts and is evaporated to dryness. The brown residue is chromatographed over 6.0 gm. acid-washed alumina using a 1:1 volume ratio of methylene chloride and ether as eluent. The pale yellow band which is eluted after a brief period is collected in one fraction and the solvent is evaporated to dryness. Recrystallization from methylene chloride give 3-nitroimidazo-[2,1:a]-isoindole; M.P. 212–214° C.

When 1,2-dicyano-4-fluorobenzene,
1,2-dicyano-4-formylbenzene,
1,2-dicyano-4-carboxamidobenzene,
1,2-dicyano-4-sulfonamidobenzene,
1,2-dicyano-4-chlorobenzene,
3,4-dicyanobiphenyl,
1,2-dicyano-4-acetylbenzene,
1,2-dicyano-4-acetylaminomethylbenzene,
1,2-dicyano-N-methyl-4-carboxamidobenzene,
1,2-dicyano-N,N-dimethyl-4-carboxamidobenzene,
1,2-dicyano-N-methyl-4-sulfonamidobenzene,
1,2-dicyano-N,N-dimethyl-4-sulfonamidobenzene,
1,2-dicyano-N-methyl-4-aminomethylbenzene,
1,2-dicyano-N,N-dimethyl-4-aminomethylbenzene,
1,2-dicyano-4-morpholinomethylbenzene,
1,2-dicyano-4-pyrrolidinomethylbenzene,
1,2-dicyano-4-piperadinomethylbenzene,
1,2-dicyano-4-hydroxymethylbenzene,
1,2-dicyano-4-methylsulfonylbenzene or
1,2-dicyano-4-trifluoromethylbenzene is used in place of phthalonitrile in the above process, there is obtained 3-nitro-7(or 8)-fluoroimidazo-[2,1:a]-isoindole,
3-nitro-7(or 8)-formylimidazo-[2,1:a]-isoindole,
3-nitro-7(or 8)-carboxamidoimidazo-[2,1:a]-isoindole,
3-nitro-7(or 8)-sulfonamidoimidazo-[2,1:a]-isoindole,
3-nitro-7(or 8)-chloroimidazo-[2,1:a]-isoindole,
3-nitro-7(or 8)-phenylimidazo-[2,1:a]-isoindole,
3-nitro-7(or 8)-acetylimidazo-[2,1:a]-isoindole,
3-nitro-7(or 8)-acetylaminomethylimidazo-[2,1:a]-isoindole,
3-nitro-7(or 8)-N-methylcarboxamidoimidazo-[2,1:a]-isoindole,
3-nitro-7(or 8)-N,N-dimethylcarboxamidoimidazo-[2,1:a]-isoindole,
3-nitro-7(or 8)-N-methylsulfonamidoimidazo-[2,1:a]-isoindole,
3-nitro-7(or 8)-N,N-dimethylsulfonamidoimidazo-[2,1:a]-isoindole,
3-nitro-7(or 8)-N-methylaminomethylimidazo-[2,1:a]-isoindole,
3-nitro-7(or 8)-N,N-dimethylaminomethylimidazo-[2,1:a]-isoindole,
3-nitro-7(or 8)-morpholinomethylimidazo-[2,1:a]-isoindole,
3-nitro-7(or 8)-pyrrolidinomethylimidazo-[2,1:a]-isoindole,
3-nitro-7(or 8)-piperadinomethylimidazo-[2,1:a]-isoindole,
3-nitro-7(or 8)-hydroxymethylimidazo-[2,1:a]-isoindole,
3-nitro-7(or 8)-methylsulfonylimidazo-[2,1:a]-isoindole or
3-nitro-7(or 8)-trifluoromethylimidazo-[2,1:a]-isoindole.

When 3,4-dicyanotoluene is used in place of phthalonitrile in the process described in the first two paragraphs above, there will be obtained 2-(2'-carboxy-4'-methylphenyl) imidazole hydrochloride.

When the procedure of Example 28 is carried out and 2-(2'-carboxy-4'-methylphenyl) imidazole is used in place of 2-(4'-biphenylyl)imidazole, 2-(2'-carboxy-4-methylphenyl)-4-nitroimidazole is obtained.

When this nitroimidazole is used in place of 2-(2'-carboxyphenyl)-4-nitroimidazole in the process of the present example, there is obtained 3-nitro-7(or 8-methylimidazo-[2,1:a]-isoindole.

Example 41.—2,7(or 8)-dinitroimidazo-[2,1:a]-isoindole

To a solution of 15.3 gm. (.0657 mol) of 2-(2'-carboxyphenyl)-4-nitroimidazole in 74 ml. 30% fuming sulfuric acid is added 7.5 ml. fuming nitric acid with stirring. After heating at 100° C. for 2¼ hours, the mixture is cooled and poured slowly with stirring into 600 ml. water. The mixture is cooled in ice and the crystalline precipitate which forms is filtered off and washed with water giving 2-(2'-carboxy-4(or 5)-nitrophenyl)-4-nitroimidazole.

The compound, 2-(2'-carboxy-4(or 5)-nitrophenyl)-4-nitroimidazole, is then treated in a manner similar to that method used when preparing 3-nitroimidazole-[2,1:a] - isoindole from 2 - (2' - carboxyphenyl)-4-nitroimidazole (Example 40). The product obtained, 3,7(or 8)-dinitroimidazo-[2,1:a]-isoindole, melts with decomposition at 200–240° C.

Example 42.—1-methyl-2-(4'-carboxyphenyl)-5-nitroimidazole 2.0 gm. of 1-methyl-2-p-tolyl-5-nitroimidazole is dissolved in a solution of 25% sulfuric acid. 3.5 gm. of sodium dichromate dihydrate dissolved in 20 ml. water is added. The resulting suspension is stirred rapidly during the gradual addition of 50 ml. concentrated sulfuric acid. The reaction solution is then heated for four hours at 75–85° C. The reaction mixture is filtered hot and the filtrate cooled in an ice bath. The pH of the filtrate is adjusted to pH 5 with 11.7 N sodium hydroxide. The crude 1-methyl - 2-(4'-carboxyphenyl)-5-nitroimidazole resulting is removed by filtration. The product is then washed well with water and extracted thoroughly with about an equal volume of aqueous sodium bicarbonate. Filtration of this extract affords 300 mg. recovered starting material. Acidification to pH 6 and filtration of the filtrate affords substantially pure 1 - methyl - 2-(4'-carboxyphenyl)-5-nitroimidazole; M.P. 255–260° C.

When 1-methyl-2-(4'-carboxyphenyl)-5-nitroimidazole is treated with diborane in accordance with the method for reducing the carboxyphenyl nitroimidazole described in Example 40, there is obtained 1-methyl-2-(4'-hydroxymethylphenyl)-5-nitroimidazole.

When 1-methyl-2-(4'-carboxyphenyl) - 5 - nitroimidazole is treated with diazomethane in accordance with the procedure of Example 12, there is obtained 1-methyl-2-(4'-carbomethoxyphenyl)-5-nitroimidazole.

Example 43.—1-methyl-2-(4'-carboxamidophenyl)-5-nitroimidazole 2.2 gm. of 1-methyl-2-(4'-carboxyphenyl)-5-nitroimidazole is slowly added to 25 ml. thionyl chloride. The reaction mixture is refluxed for ½ hour. The thionyl chloride is evaporated in vacuo, and the flask is purged with benzene. The flask of crystalline material is chilled in a Dry Ice bath and 100 ml. methanol saturated with ammonia is added. The reaction mixture is stirred, warmed to 40° C. and retained at that temperature for 30 minutes. The solvent in then evaporated in vacuo. The residue is dissolved in refluxing 1,2-dimethoxyethane and the mixture filtered to remove ammonium chloride. The solvent is evaporated and the solution is allowed to crystallize. Recrystallization from isopropanol affords substantially pure 1-methyl-2-(4' - carboxamidophenyl) - 5 - nitroimidazole; M.P. 232–235° C.

When hydrazine is used in place of ammonia in the above process, there is obtained 1-methyl-2-(4'-carboxhydrazidophenyl)-5-nitroimidazole.

Example 44.—1-(2'-hydroxyethyl)-2-(4'-fluorophenyl)-5-nitroimidazole 4.00 gm. (19.3 mmol) of 2-(4'-fluorophenyl)-4-nitroimidazole and 4.7 ml. β-ethoxyethyl tosylate are heated together in a 170–175° C. oil bath for 1 hour with occasional stirring until the mixture becomes homogeneous. The mixture is cooled to near room temperature and dissolved by agitating with a mixture of about 50 ml. of chloroform and 50 ml. 4 N ammonium hydroxide. The chloroform phase is extracted twice with 2 N ammonium hydroxide and dried over sodium sulfate. Evaporation to dryness in vacuo gives a black syrup which is filtered through 30 gm. of basic alumina in 1,2-dichloromethane: ether. The very pale yellow band which comes through the column fairly rapidly is collected and evaporated in vacuo to give a yellow oil which crystallizes on seeding. The crude product is recrystallized from ether-hexane giving pale brown crystals of 1-(2'-ethoxyethyl)-2-(4'-fluorophenyl)-5-nitroimidazole.

57 mg. (.20 mmol) of the above product is heated at 100° C. in .3 ml. concentrated sulfuric acid for ½ hour. The mixture is diluted with 1.5 ml. water and heated an additional hour. The solution is treated with charcoal, diluted with 1 ml. water and treated dropwise with .7 ml. of 11.7 N sodium hydroxide while cooled in ice. The crystalline precipitate which forms is filtered off, washed with water and air dried. This material is recrystallized from benzene and then with charcoal treatment from methanol-water giving 1-(2'-hydroxyethyl)-2-(4'-fluorophenyl)-5-nitroimidazole; M.P. 165–167° C.

The tosylate ester is prepared by adding 36.0 gm. (.40 mol) of β-ethoxyethanol to a solution of 76.2 gm. tosyl chloride (.40 mol) in 150 ml. pyridine. The mixture is cooled at intervals in an ice bath to keep the temperature below 30° C. After about 2 hours at room temperature the mixture is poured into excess dilute 1 N hydrochloric acid and the product is extracted with ether. After drying over sodium sulfate, the ether is removed in vacuo to leave the product which is used without further purification.

When di(ethoxyethyl)sulfate or methoxydiazoethane is used in place of the ethoxyethyl tosylate in the above process, 1 - (2' - hydroxyethyl) - 2 - (4' - fluorophenyl)-5-nitroimidazole is again obtained.

When the above procedure is carried out and 5 ml. of 4 N sodium hydroxide is added to the nitroimidazole-tosylate reaction mixture before heating, 1-(2'-hydroxyethyl)-2-(4'-fluorophenyl)-4-nitroimidazole is obtained.

When the above process is carried out using 2-phenyl-4-nitroimidazole,
2-(4'-tolyl)-4-nitroimidazole,
2-(4'-carboxyphenyl)-4-nitroimidazole,
2-(2'-hydroxyphenyl)-4-nitroimidazole,
2-(4'-chlorophenyl)-4-nitroimidazole,
2-(4'-trifluoromethylphenyl)-4-nitroimidazole,
2-(4'-biphenylyl)-4-nitroimidazole,
2-(4'-acetamidophenyl)-4-nitroimidazole,
2-(2'-nitrophenyl)-4-nitroimidazole,
N',N'-dimethyl-2-(3'-sulfonamidophenyl)-4-nitroimidazole,
2-(2'-methoxyphenyl)-4-nitroimidazole,
2-(3'-methylthiophenyl)-4-nitroimidazole,
2-(4'-formylphenyl)-4-nitroimidazole,
2-(2'-acetylphenyl)-4-nitroimidazole,
N'-methyl-2-(2'-acetamidophenyl)-4-nitroimidazole,
N',N'-dimethyl-2-(4'-aminomethylphenyl)-4-nitroimidazole,
2-(3'-methylsulfonylphenyl)-4-nitroimidazole or
2-(3'-hydroxymethylphenyl)-4-nitroimidazole in place of 2-(4'-fluorophenyl)-4-introimidazole, there is obtained
1-(2'-hydroxyethyl)-2-phenyl-5-nitroimidazole,
1-(2'-hydroxyethyl)-2-(4'-tolyl)-5-nitroimidazole,
1-(2'-hydroxyethyl)-2-(4'-carboxyphenyl)-5-nitroimidazole,
1-(2'-hydroxyethyl)-2-(2'-hydroxyphenyl)-5-nitroimidazole,
1-(2'-hydroxyethyl)-2-(4'-chlorophenyl)-5-nitroimidazole,
1-(2'-hydroxyethyl)-2-(4'-trifluoromethylphenyl)-5-nitroimidazole,
1-(2'-hydroxyethyl)-2-(4'-biphenylyl)-5-nitroimidazole,
1-(2'-hydroxyethyl)-2-(4'-aminophenyl)-5-nitroimidazole,
1-(2'-hydroxyethyl)-2-(2'-nitrophenyl)-5-nitroimidazole,
N',N'-dimethyl-1-(2'-hydroxyethyl)-2-(3'-sulfonamidophenyl)-5-nitroimidazole,
1-(2'-hydroxyethyl)-2-(2'-methoxyphenyl)-5-nitroimidazole,
1-(2'-hydroxyethyl)-2-(3'-methylthiophenyl)-5-nitroimidazole,
1-(2'-hydroxyethyl)-2-(4'-formylphenyl)-5-nitroimidazole,
1-(2'-hydroxyethyl)-2-(2'-acetylphenyl)-5-nitroimidazole,
N'-methyl-1-(2'-hydroxyethyl)-2-(2'-aminophenyl)-5-nitroimidazole,
N',N'-dimethyl-1-(2'-hydroxyethyl)-2-(4'-aminomethylphenyl)-5-nitroimidazole,
1-(2'-hydroxyethyl)-2-(3'-methylsulfonylphenyl)-5-nitroimidazole or
1-(2'-hydroxyethyl)-2-(3'-hydroxymethylphenyl)-5-nitroimidazole, respectively.

Example 45.—1-methyl-2-(4'-amidinophenyl)-5-nitroimidazole hydrochloride

A mixture of 2.74 gm. (10 mmol) of 1-methyl-2-(4'-ethoxyiminocarbonylphenyl)-5-nitroimidazole and .54 gm. (10 mmol) of ammonium chloride in 25 ml. of methanol is refluxed 6 hours, cooled, and the solvent removed in vacuo. The residue is crystallized from alcohol to give substantially pure 1-methyl-2-(4'-amidinophenyl)-5-nitroimidazole hydrochloride.

When the above process is carried out using methyl ammonium chloride, dimethyl ammonium chloride, piperidine hydrochloride, morpholine hydrochloride or pyrrolidine hydrochloride in place of ammonium chloride, there is obtained 1,N-dimethyl-2-(4'-amidinophenyl)-5-nitroimidazole hydrochloride, 1,N,N-trimethyl-2-(4'-amidinophenyl)-5-nitroimidazole, 1 - methyl-2-(4'-N-piperidinoiminocarbonyl-phenyl) - 5 - nitroimidazole, 1-methyl - 2 - (4'-N-morpholino-iminocarbonylphenyl)-5-nitroimidazole, or 1-methyl-2-(4'-N-pyrrolidinoiminocarbonyl)-5-nitroimidazole, respectively.

Example 46.—2-(4'-hydroxymethylphenyl)-4-nitroimidazole 1.5 gm. of 2-(4'-hydroxymethylphenyl) imidazole is added to a solution of .6 ml. of concentrated nitric acid in 5.5 ml. of acetic anhydride. The mixture is heated on the steam bath for about 10 minutes and is then allowed to cool to room temperature. The reaction mixture is then added to 25 ml. of 4 N sulfuric acid and the resulting mixture is refluxed for one hour. The reaction mixture is then cooled and sodium bicarbonate is added until a pH of 3 is attained giving 2-(4'-hydroxymethylphenyl)-4-nitroimidazole.

Example 47.—3-nitro-5,6-dihydroimidazo-[2,1:a]-isoquinoline 500 mg. (2.1 mmol.) of 2-(2'-chloromethylphenyl)-4-nitroimidazole is refluxed for 2 hours in 5 ml. methanol with 103 mg. (2.1 mmol.) sodium cyanide. The methanol is removed in vacuo and the residue of crude 2-(2'-cyanomethylphenyl)-4-nitroimidazole is refluxed 4 hours with 5 ml. 25% sulfuric acid. The acid solution is cooled and treated slowly with 2.5 N aqueous sodium hydroxide while stirring and cooling in ice until the pH is about 2. The precipitated crude product, 2-(2'-carboxymethylphenyl)-4-nitroimidazole, is recrystallized from ethanol to give substantially pure material.

220 mg. 2-(2'-carboxymethylphenyl)-4-nitroimidazole is dissolved in 5 ml. 1,2-dimethoxyethane and treated with execess gaseous diborane over a period of 20 minutes. The diborane is generated by adding dropwise 7 ml. of 1 M sodium borohydride in 1,2-dimethoxy ethane to 2.3 ml. of boron trifluoride etherate in 5 ml. of 1,2-dimethoxy ethane. The reaction mixture is allowed to stand at room temperature for 1 hour and is diluted carefully with 20 ml. water and 1 ml. 2.5 N hydrochloric acid. The mixture is extracted three times with 25 ml. portions of ethyl acetate and the combined extracts are then dried over sodium sulfate and evaporated to dryness in vacuo. The residual crude 2-[2'-($\beta$-hydroxyethyl)-phenyl]-4-nitroimidazole is recrystallized from ethanol-ether.

150 mg. 2-[2'-($\beta$-hydroxyethyl)-phenyl]-4-nitroimidazole (.64 mmol) is refluxed for 4 hours with 2 ml. of thionyl chloride. The excess thionyl chloride is removed in vacuo and the residue is treated with 5 ml. of water. The resulting mixture is extracted with 3 ml. of chloroform three times and the combined extracts are dried and evaporated in vacuo leaving a residue of crude 2-[2'-($\beta$-chloroethyl)-phenyl]-4-nitroimidazole. This is purified by passage over 1.5 gm. of acid washed alumina using 1:1 ethyl acetate-ether as solvent. The solvent is removed in vacuo and the residue is heated at 200° C. for 20 minutes giving 3-nitro-5,6-dihydroimidazo-[2,1:a] isoquinoline.

It should be understood that although this invention has been described with reference to particular embodiments thereof, changes and modifications may be made which are within its intended scope and it should be limited only by the language of the appended claims.

We claim:
1. A process for preparing a compound of the formula

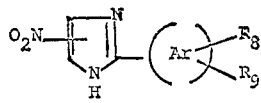

where Ar is phenyl or naphthyl; $R_8$ is selected from the group consisting of hydrogen, halo, carboxamido, nitro and loweralkoxy; and $R_9$ is selected from the group consisting of hydrogen, loweralkyl, carboxy, phenyl, halo, hydroxy, diloweralkylamino, nitro, diloweralkylsulfonamido, loweralkoxy, loweralkylthio, cyano, carboxamido, loweralkylcarboxamido, diloweralkylcarboxamido, loweralkanoyl, acetylaminoethyl, diloweralkylamino-loweralkyl, N'-morpholinoloweralkyl, N'-piperidinoloweralkyl, N'-pyrrolidinoloweralkyl, loweralkoxycarbonyl and loweralkylsulfonyl, which comprises treating a compound of the formula

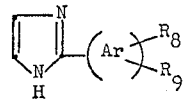

where Ar, $R_8$ and $R_9$ are as defined above with concentrated nitric acid and a compound selected from the group consisting of RCOOH and $(RCO)_2O$ where R is loweralkyl.

2. A process for preparing a compound of the formula

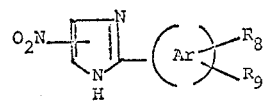

where Ar is phenyl or naphthyl; $R_8$ is selected from the group consisting of hydrogen, halo, carboxamido, nitro and loweralkoxy; and $R_9$ is selected from the group consisting of hydrogen, loweralkyl, carboxy, phenyl, halo, hydroxy, diloweralkylamino, nitro, diloweralkylsulfonamido, loweralkoxy, loweralkylthio, cyano, carboxamido, loweralkylcarboxamido, diloweralkylcarboxamido, loweralkanoyl, acetylaminoethyl, diloweralkylaminoloweralkyl, N'-morpholinoloweralkyl, N'-piperidinoloweralkyl, N'-pyrrolidinoloweralkyl, loweralkoxycarbonyl and loweralkylsulfonyl, which comprises treating a compound of the formula

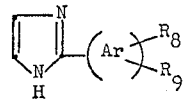

where Ar, $R_8$ and $R_9$ are as defined above with concentrated nitric acid and a compound selected from the group consisting of acetic acid and acetic anhydride.

3. A process for preparing 2-(4'-fluorophenyl)-4-nitroimidazole which comprises treating 2-(4'-fluorophenyl) imidazole with fuming nitric acid and acetic anhydride.

References Cited
UNITED STATES PATENTS 2,933,503    4/1960    Clark et al. _____ 260—578
2,963,504    12/1960   Thelin et al. _____ 260—578
3,121,092    2/1964    Geiszler _____ 260—310

OTHER REFERENCES

Hazeldine et al.: Jour. Chem. Soc. (London), vol. 125, pp. 1431–41 (1924).
Ochiai et al.: Chem. Abst., vol. 35, col. 458 (1941).
Blatt: Organic Syntheses, vol. 2, pp. 449–50 (1943).
Weygand: Org. Preparations, pp. 280–2, N.Y., Interscience, 1945.
Hofmann: Imidazole and Its Derivatives, Part I, pp. 127–31, N.Y., Interscience, 1953.
Olah et al.: Jour. Amer. Chem. Soc., vol. 84, pp. 3687–93 (1962).

JOHN D. RANDOLPH, *Primary Examiner.*

N. TROUSOF, *Assistant Examiner.*